(12) United States Patent
Chen et al.

(10) Patent No.: US 10,175,493 B1
(45) Date of Patent: Jan. 8, 2019

(54) PROJECTION LENS SYSTEM, PROJECTION APPARATUS, SENSING MODULE AND ELECTRONIC DEVICE

(71) Applicant: LARGAN PRECISION CO., LTD., Taichung (TW)

(72) Inventors: Chun-Yen Chen, Taichung (TW); Shu-Yun Yang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 15/868,075

(22) Filed: Jan. 11, 2018

(30) Foreign Application Priority Data

Jul. 31, 2017 (TW) .............................. 106125763 A

(51) Int. Cl.
| | |
|---|---|
| G02B 27/09 | (2006.01) |
| G02B 13/16 | (2006.01) |
| G02B 13/18 | (2006.01) |
| G02B 9/60 | (2006.01) |
| G02B 9/34 | (2006.01) |
| G03B 15/02 | (2006.01) |
| G02B 27/42 | (2006.01) |
| G02B 1/04 | (2006.01) |

(52) U.S. Cl.
CPC ......... *G02B 27/0955* (2013.01); *G02B 1/041* (2013.01); *G02B 9/34* (2013.01); *G02B 9/60* (2013.01); *G02B 13/16* (2013.01); *G02B 13/18* (2013.01); *G02B 27/0916* (2013.01); *G02B 27/0944* (2013.01); *G02B 27/425* (2013.01); *G03B 15/02* (2013.01)

(58) Field of Classification Search
CPC ...... G02B 27/0955; G02B 1/041; G02B 9/34; G02B 9/60; G02B 13/16; G02B 27/0916; G02B 27/0944; G02B 27/425
See application file for complete search history.

(56) References Cited

U.S. PATENT DOCUMENTS

| | | | |
|---|---|---|---|
| 4,985,634 A * | 1/1991 | Stengl | B82Y 10/00 250/281 |
| 8,508,855 B2 | 8/2013 | Yamamoto | |
| 8,947,792 B2 | 2/2015 | Yamamoto | |
| 9,445,010 B2 | 9/2016 | Shpunt et al. | |
| 2010/0165429 A1 * | 7/2010 | Buckley | G02B 26/06 359/9 |
| 2010/0267163 A1 * | 10/2010 | Ran | G01N 21/553 436/164 |
| 2012/0147342 A1 * | 6/2012 | Lin | G03B 3/04 353/122 |

(Continued)

FOREIGN PATENT DOCUMENTS

| | | |
|---|---|---|
| TW | I407150 B | 9/2013 |
| TW | I588535 B | 6/2017 |

*Primary Examiner* — Anne M Hines
(74) *Attorney, Agent, or Firm* — McClure, Qualey & Rodack, LLP

(57) ABSTRACT

A projection lens system having a magnification side and a reduction side, which projects light from a conjugation surface on the reduction side onto a conjugation surface on the magnification side. The projection lens system includes a focus tunable component and a lens assembly, wherein the lens assembly includes a plurality of lens elements, and at least one surface of at least one of the lens elements includes at least one inflection point.

33 Claims, 20 Drawing Sheets

(56) References Cited

U.S. PATENT DOCUMENTS

| | | | |
|---|---|---|---|
| 2013/0050432 A1* | 2/2013 | Perez | G02B 27/017 348/47 |
| 2017/0038565 A1 | 2/2017 | Lin | |
| 2017/0059972 A1 | 3/2017 | Ichimura | |
| 2017/0324895 A1* | 11/2017 | Bryll | G06T 7/0004 |
| 2018/0210181 A1* | 7/2018 | Kim | G02B 17/08 |

* cited by examiner

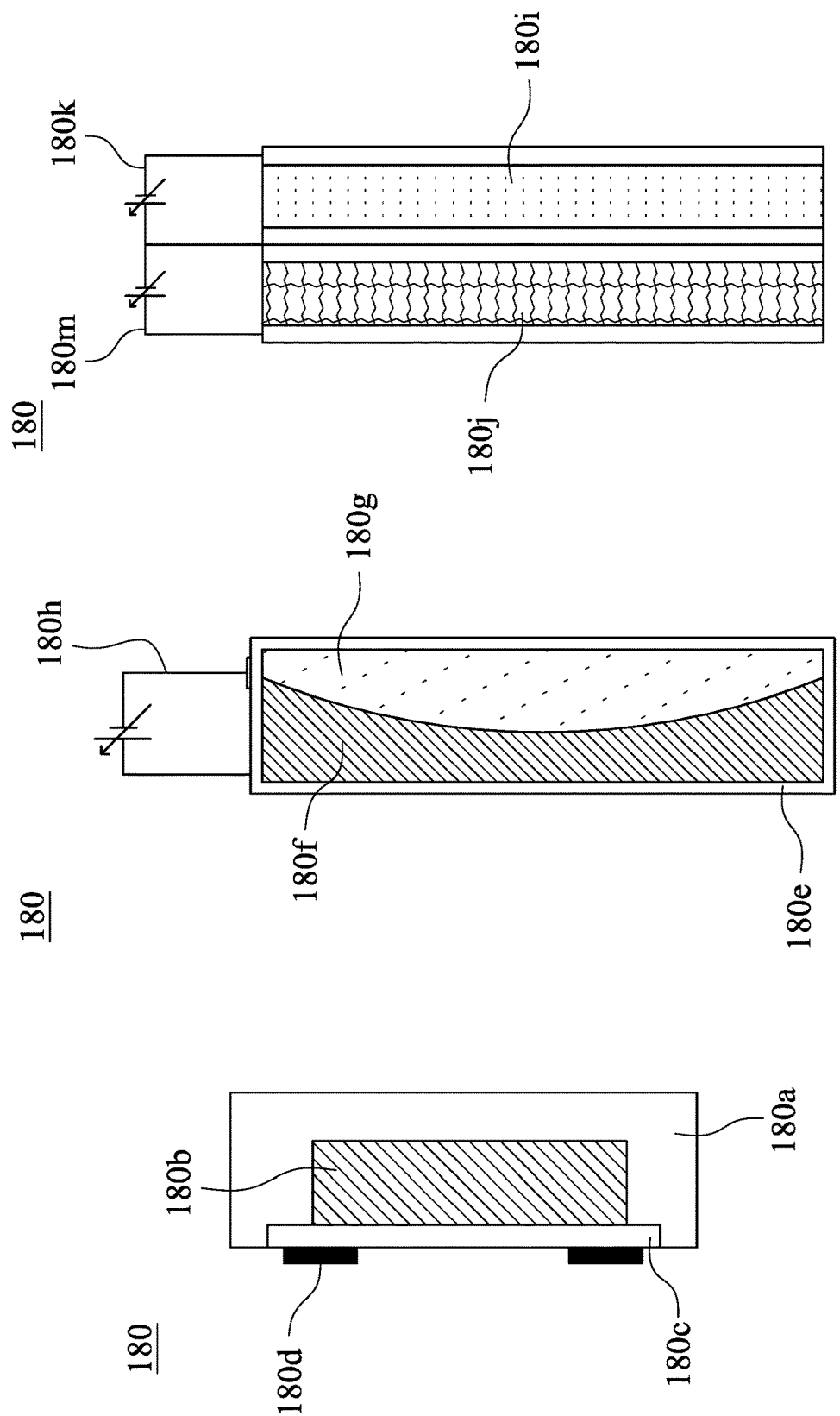

PROJECTION LENS SYSTEM, PROJECTION APPARATUS, SENSING MODULE AND ELECTRONIC DEVICE

RELATED APPLICATIONS

This application claims priority to Taiwan Application Serial Number 106125763, filed on Jul. 31, 2017, which is herein incorporated by reference.

BACKGROUND

Technical Field

The present disclosure relates to a projection lens system, a projection apparatus and a sensing module. More particularly, the present disclosure relates to a projection lens system, a projection apparatus and a sensing module with compactness applicable to electronic devices.

Description of Related Art

With wider applications of photographing modules, specifications of lens assemblies in response to market demands are becoming diverse and strict. The size of products is hard to reduce due to the restrictions of shapes of lens elements and material selection in conventional photographing modules, and it is also hard to keep a balance among molding of lens elements, assembling convenience and system sensitivity. Moreover, a lens assembly with auto-focus ability can adjust the focal length thereof depending on the location of imaged object, and therefore obtain clear image on an image surface as well as increase resolution of the image and optimize the image quality. Hence, one lens assembly featuring compactness, easily assembling property and high image quality will fully satisfy market specifications and demands.

In the past, developments of interactive games or storages of images are mostly limited to two-dimensional space. However, there are still certain differences among two-dimensional images and the real images seen by eyes. In order to provide more accessible situations by electronic devices, or in order to promote conveniences of life, extraction and application of three-dimensional information will be a trend in the future development of technology. The acting principle of electronic devices with three-dimensional image capturing and interaction is to project a light source with a specific characteristic onto an object, and with another lens assembly receiving the reflected light, the distance between each portion of the object and the lens assembly can be calculated and the information of the three-dimensional image can be obtained, and hence the specific action or mission can be fulfilled after determining the message from the action of the object. Applications of three-dimensional image capturing and interaction are various in the market presently, such as motion-sensing games, virtual reality, 3D image capturing devices, face recognition, driving assisting systems, intelligent electronic devices, multiple lens devices, wearable devices, digital cameras, image recognition systems, entertainment systems, sporting cameras and intelligent home assisting systems, etc. in electronic devices.

SUMMARY

According to one aspect of the present disclosure, a projection lens system having a magnification side and a reduction side, which projects light from a conjugation surface on the reduction side onto a conjugation surface on the magnification side. The projection lens system includes a focus tunable component and a lens assembly, wherein the lens assembly includes a plurality of lens elements, and at least one surface of at least one of the lens elements includes at least one inflection point. When a focal length of the projection lens system is f, and a focal length of the focus tunable component is ft, the following condition is satisfied: $0<|\Delta(f/ft)|<0.15$.

According to another aspect of the present disclosure, a projection apparatus includes the projection lens system of the aforementioned aspect, and at least one light source disposed on the reduction side of the projection lens system.

According to further another aspect of the present disclosure, a sensing module includes a projection apparatus and an image sensing apparatus, wherein the projection apparatus includes the projection lens system of the aforementioned aspect and at least one light source, and the image sensing apparatus includes an imaging lens system and an image sensor, the image sensor is disposed on an image surface of the imaging lens system. The imaging lens system is for receiving information on the conjugation surface on the magnification side of the projection lens system, and also for imaging the information on the image sensor.

According to still another aspect of the present disclosure, an electronic device includes the sensing module of the aforementioned aspect.

BRIEF DESCRIPTION OF THE DRAWINGS

The present disclosure can be better understood by reading the following detailed description of the embodiments, with reference made to the accompanying drawings as follows:

FIG. 11A is a schematic view of the focus tunable component being a liquid lens set according to the 1st embodiment;

FIG. 11B is a schematic view of the focus tunable component being another liquid lens set according to the 1st embodiment;

FIG. 11C is a schematic view of the focus tunable component being a liquid crystal lens set according to the 1st embodiment;

DETAILED DESCRIPTION

Figure 1:
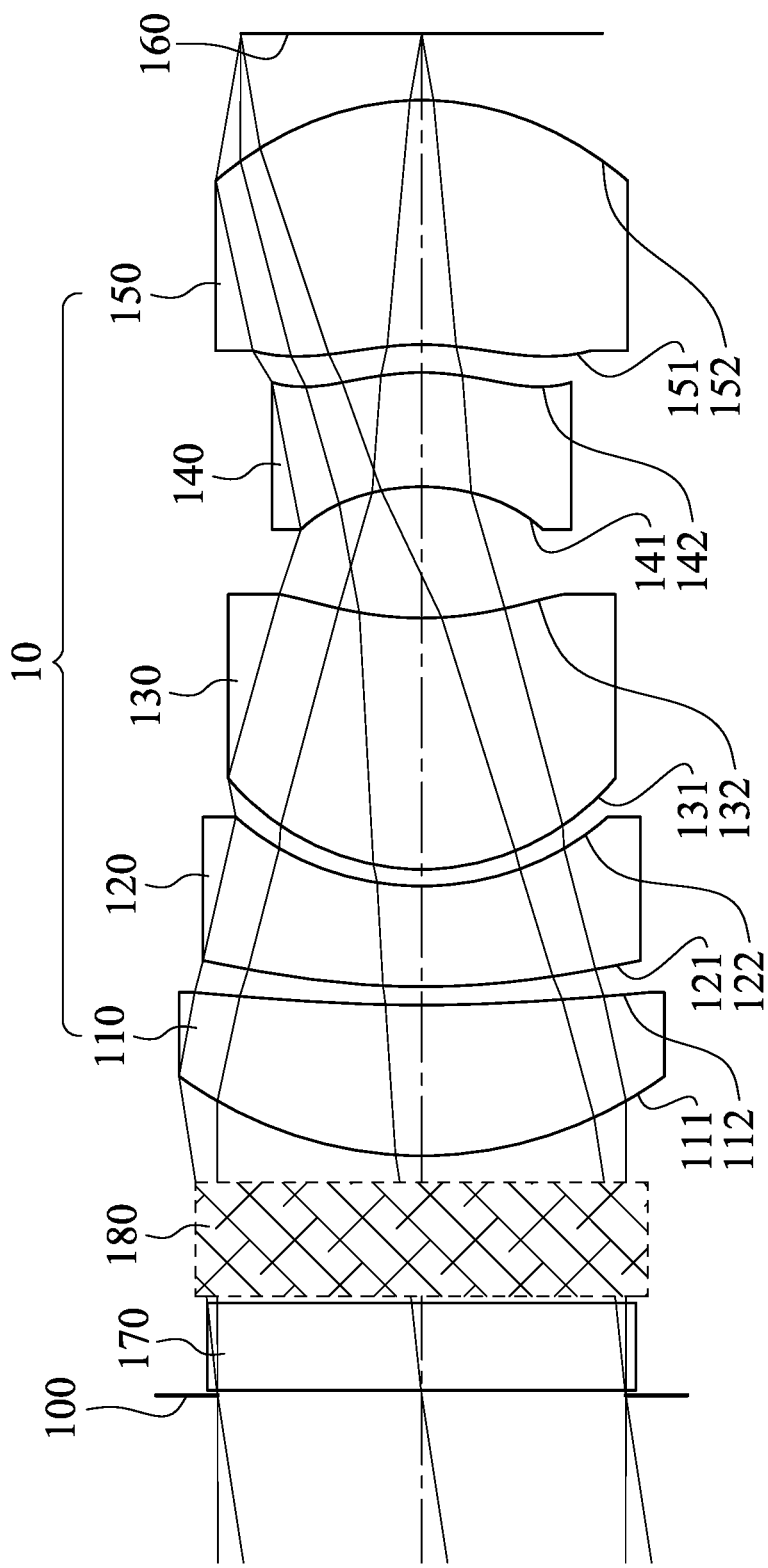
FIG. 1 is a schematic view of a projection apparatus according to the 1st embodiment of the present disclosure.

A projection lens system has a magnification side and a reduction side, which projects light from a conjugation surface on the reduction side onto a conjugation surface on the magnification side. The projection lens system includes a focus tunable component and a lens assembly, wherein the lens assembly includes a plurality of lens elements, and the focus tunable component can be disposed on a magnification side of the lens assembly.

At least one surface of at least one of the lens elements includes at least one inflection point. Therefore, it is favorable for reducing the number of the lens elements in the lens assembly as well as reducing the total track length of the projection lens system, so as to obtain compactness.

When a focal length of the projection lens system is f, and a focal length of the focus tunable component is ft, the following condition is satisfied: $0<|\Delta(f/ft)|<0.15$. Therefore, the variation of the refractive power of the focus tunable component can be controlled by adjusting the focal length of the focus tunable component in accordance with different situations, so as to obtain auto-focus function which is favorable for achieving optical focusing under the compact condition, and further enhancing projection quality. Preferably, the following condition can be satisfied: $0<|\Delta(f/ft)|<0.05$. More preferably, the following condition can be satisfied: $0<|\Delta(f/ft)|<0.03$.

When a focal length of the lens assembly is fa, and the focal length of the focus tunable component is ft, the following condition is satisfied: $|fa/ft|<0.10$. Therefore, it is favorable for reducing the sensitivity of the projection lens system and obtaining effects of auto-focusing and compactness at the same time by adjusting focal lengths of the focus tunable component and the lens assembly, so as to apply to more electronic devices. Preferably, the following condition can be satisfied: $|fa/ft|<0.05$. More preferably, the following condition can be satisfied: $|fa/ft|<0.03$.

When a focal length of the focus tunable component at a temperature of 50° C. is ft50, and the focal length of the projection lens system is f, the following condition is satisfied: $|ft50/(100\times f)|<15.0$. Therefore, it is favorable for maintaining preferable projection quality of the projection lens system at different temperatures by controlling the variation of the focal length at the specific temperature, so as to enhance the characteristic of anti-environmental change. Preferably, the following condition can be satisfied: $|ft50/(100\times f)|<5.50$.

When an axial distance between the focus tunable component and one of the lens elements closest to the magnification side in the lens assembly is Dtm, and a central thickness of the focus tunable component is CTt, the following condition is satisfied: $0.01<Dtm/CTt<1.0$. Therefore, it is favorable for controlling the yield rate of the focus tunable component and reducing the total track length of the projection lens system by adjusting the thickness of the focus tunable component and the distance between the focus tunable component and the lens assembly. Preferably, the following condition can be satisfied: $0.01<Dtm/CTt<0.50$.

When the focal length of the projection lens system is f, a projection distance on the magnification side of the projection lens system (that is, an axial distance between the conjugation surface on the magnification side to the projection lens system) is OBJ, and the following condition is satisfied: $0.01<10\times f/OBJ<0.25$. Therefore, the ratio between the projection distance on the magnification side of the projection lens system and the focal length thereof can be controlled so as to adjust the magnification factor thereof for enlarging the projection area of the light source. Preferably, the following condition can be satisfied: $0.01<10\times f/OBJ<0.15$.

When the focal length of the projection lens system is f, and a curvature radius of a magnification-side surface of one of the lens elements closest to the magnification side in the lens assembly is Rm, the following condition is satisfied: $f/Rm<3.0$. Therefore, it is favorable for forming the lens element and increasing the manufacturing yield rate of the lens element effectively by controlling the curvature radius of the magnification-side surface of the lens element closest to the magnification side.

When a wavelength of light incident into the projection lens system is λ, the following condition is satisfied: $750\ nm<\lambda<1500\ nm$. Therefore, when the proper wavelength range is selected, human body's thermal radiation can be captured, so that it is favorable for avoiding the interference of the background during sensing, and can also be utilized for distance calculation.

The focus tunable component can be a liquid lens set or a liquid crystal lens set. Therefore, it is favorable for obtaining the compactness and the auto-focus effect under short-distance condition by arranging the liquid lens set or the liquid crystal lens set which can cooperate with external controlling unit (such as circuit, pressure etc.) for changing the focal length of the projection lens system.

When a maximum value of refractive indices of materials of the focus tunable component and the lens elements of the lens assembly is Nmax, the following condition is satisfied: $Nmax<1.70$. Therefore, it is favorable for reducing the cost and obtaining the compactness by properly arranging the materials of the focus tunable component and the lens elements.

The lens assembly can include three lens groups, in order from the magnification side to the reduction side, having positive refractive power, negative refractive power and positive refractive power respectively. Therefore, it is favorable for increasing the symmetry of the projection lens system and reducing the sensitivity thereof by adjusting the refractive power of the lens assembly.

At least three of the lens elements of the lens assembly have Abbe numbers smaller than 30.0. Therefore, it is favorable for correcting aberrations of the projection lens system by controlling the arrangement of material of each lens element, so as to enhance the projection quality. Preferably, at least three of the lens elements of the lens assembly can have Abbe numbers smaller than 23.0.

When an axial distance between a reduction-side surface of one of the lens elements closest to the reduction side in the lens assembly and the conjugation surface on the reduction side is BL, and the focal length of the projection lens system is f, the following condition is satisfied: $0.01 < BL/f < 0.30$. Therefore, it is favorable for forming the compact structure and obtaining sufficient illumination by controlling the ratio between the focal length and the back focal length of the projection lens system. Preferably, the following condition can be satisfied: $0.01 < BL/f < 0.15$.

When an effective radius of a reduction-side surface of one of the lens elements closest to the reduction side in the lens assembly is SDr, and an effective radius of a magnification-side surface of one of the lens elements closest to the magnification side in the lens assembly is SDm, the following condition is satisfied: $0.10 < SDr/SDm < 1.20$. Therefore, it is favorable for increasing the assembling yield rate of the projection lens system, enlarging the projection area and maintaining the light intensity by adjusting the ratio between the effective radius of the reduction-side surface of the lens element closest to the reduction side and the effective radius of the magnification-side surface of the lens element closest to the magnification side in the lens assembly.

When a maximum value of effective radii of all surfaces of the lens elements in the lens assembly is SDmax, the following condition is satisfied: $0.1 \text{ mm} < SDmax < 0.98 \text{ mm}$. Therefore, it is favorable for maintaining the compactness and reducing the size of the projection lens system by controlling the maximum value of effective radii of all surfaces of the lens elements in the lens assembly.

When a vertical distance between a position of an inflection point on a magnification-side surface of one of the lens elements closest to the reduction side in the lens assembly and an optical axis is Yp1, a vertical distance between a position of an inflection point on a reduction-side surface of the lens element closest to the reduction side in the lens assembly and the optical axis is Yp2, and the focal length of the projection lens system is f, the following condition is satisfied: $0.01 < Yp1/f < 1.0$ or $0.01 < Yp2/f < 1.0$. Therefore, it is favorable for receiving the incident light as well as avoiding the stray light and maintaining the illumination of the incident light, and it is also favorable for correcting aberrations of the incident light by controlling the surface shape variation of the lens element closest to the reduction side, so as to optimize the projection quality. Preferably, the following condition can be satisfied: $0.01 < Yp1/f < 0.50$; or $0.01 < Yp2/f < 0.50$.

The projection lens system can further include an aperture stop. When a diameter of the aperture stop is DS, and an axial distance between a magnification-side surface of one of the lens elements closest to the magnification side in the lens assembly and the conjugation surface on the reduction side is TL, the following condition is satisfied: $TL/DS < 4.0$. Therefore, it is favorable for enlarging the projection range which can increase the projection illuminance and reducing the total track length by adjusting the specification of the projection lens system. Preferably, the following condition can be satisfied: $1.0 < TL/DS < 3.50$.

When an f-number of the projection lens system is Fno, the following condition is satisfied: $1.50 < Fno < 3.0$. Therefore, the projection illuminance can be enhanced by controlling the amount of incident light, thus it is favorable for a sensing module including the projection lens system to obtain sufficient information under situations such as insufficient external light (i.e. nighttime) etc., so that an electronic device including the sensing module can obtain the image with certain quality so as to increase the using opportunity thereof. Preferably, the following condition can be satisfied: $1.60 < Fno < 2.60$.

When half of a maximum field of view of the projection lens system is HFOV, the following condition is satisfied: $|\tan(HFOV)| < 0.30$. Therefore, it is favorable for gathering the projection light and increasing the illuminance on the projection surface by controlling the half of a maximum field of view of the projection lens system, so as to enhance the projection quality thereof. Preferably, the following condition can be satisfied: $|\tan(HFOV)| < 0.25$.

When an optical distortion of an effective radius position on the conjugation surface on the reduction side of the projection lens system is DIST, the following condition is satisfied: $'DIST' < 1\%$. Therefore, it is favorable for avoiding the deformation or distortion of the image by controlling the optical distortion of the projection lens system, so as to optimize the projection quality. Preferably, the following condition can be satisfied: $|DIST| < 0.30\%$.

At least half of a total number of the lens elements in the lens assembly are made of plastic materials, and both of a reduction-side surface and a magnification-side surface of each of the lens elements made of the plastic materials are aspheric. Therefore, it is favorable for reducing the cost effectively and obtaining the compactness by properly arranging the material of each lens element.

When a temperature coefficient of refractive index of each of the lens elements made of the plastic materials in the lens assembly is dn/dt, the following condition is satisfied: $-150 \times 10^{-6}$ (1/° C.)$< dn/dt < -50 \times 10^{-6}$ (1/° C.). Therefore, it is favorable for maintaining the compactness and reducing the manufacturing cost at different environment temperature by adjusting the material of the specific lens element in the lens assembly.

When a curvature radius of a reduction-side surface of one of the lens elements closest to the reduction side in the lens assembly is Rr, and a curvature radius of a magnification-side surface of one of the lens elements closest to the magnification side in the lens assembly is Rm, the following condition is satisfied: $-1.0 < (Rr+Rm)/(Rr-Rm) < 1.0$. Therefore, it is favorable for reducing the sensitivity of the projection lens system by increasing the symmetry of the lens assembly. Preferably, the following condition can be satisfied: $-0.50 < (Rr+Rm)/(Rr-Rm) < 0.50$.

When a total number of the lens elements in the lens assembly is N, the following condition is satisfied: $2 \leq N \leq 7$. Therefore, it is favorable for balancing the compactness and the projection quality and increasing flexibility of design by controlling the number of the lens elements in the lens assembly.

When a sum of central thicknesses of the lens elements in the lens assembly is $\Sigma CTa$, the following condition is satisfied: $\Sigma CTa < 4.0$ mm. Therefore, it is favorable for reducing the total track length of the projection lens system and maintaining the compactness thereof by controlling the sum of central thicknesses of the lens elements in the lens assembly. Preferably, the following condition can be satisfied: $1.0 \text{ mm} < \Sigma CTa < 3.0 \text{ mm}$.

When a maximum effective diameter of the light source is DL, the following condition is satisfied: $0.1 \text{ mm} < DL < 1.50 \text{ mm}$. Therefore, it is favorable for maintaining the compactness and enhancing the intensity of the light per unit area by controlling the maximum effective diameter of the light source. In detail, the maximum effective diameter of the light source is the maximum diameter of the light source on the conjugation surface on the reduction side passing through the projection lens system.

Each of the aforementioned features of the projection lens system can be utilized in various combinations for achieving the corresponding effects.

According to the projection lens system of the present disclosure, the lens elements thereof can be made of plastic or glass materials. When the lens elements are made of plastic materials, manufacturing costs can be effectively reduced. When the lens elements are made of glass materials, the distribution of the refractive power of the projection lens system may be more flexible to design. Furthermore, surfaces of each lens element can be arranged to be aspheric, since the aspheric surface of the lens element is easy to form a shape other than a spherical surface so as to have more controllable variables for eliminating aberrations thereof, and to further decrease the required number of lens elements in the projection lens system. Therefore, the total track length of the projection lens system can also be reduced.

According to the projection lens system of the present disclosure, each of a magnification-side surface and a reduction-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the projection lens system of the present disclosure, the refractive power or the focal length of a lens element being positive or negative may refer to the refractive power or the focal length in a paraxial region of the lens element.

According to the projection lens system of the present disclosure, the projection lens system can include at least one stop, such as an aperture stop, a glare stop or a field stop. Said glare stop or said field stop is for eliminating the stray light and thereby improving the image resolution thereof.

According to the projection lens system of the present disclosure, an inflection point is defined as a point of the lens surface where the lens surface changes from positive curvature to negative curvature or from negative curvature to positive curvature.

According to the present disclosure, a projection apparatus includes the aforementioned projection lens system and at least one light source, the light source is disposed on the reduction side of the projection lens system. The projection apparatus can include not only the lens assembly and the focus tunable component, but can further include a barrel member for carrying the lens assembly, a holder member, a driving member, a mechanical member, a laser source and an image stabilization module etc.

In detail, the lens assembly can include two, three, four, five, six or seven lens elements on demand.

The focal length of the focus tunable component is variable in accordance with different condition, so as to correct projection quality under different photographing conditions and environments. Preferably, the focus tunable component can be utilized at auto-focusing, which can be a liquid lens set, a liquid crystal lens set or other optical element set which can provide auto-focus function and can change the focal length of the projection lens system by external controlling unit (such as circuit, pressure etc.). The focus tunable component can achieve the auto-focus effect under compact condition, or can reduce the magnetic field interference of the module, so as to apply on portable electronic devices, such as front lens assembly of mobile phone, but will not be limited thereto. Preferably, an axial distance between the focus tunable component and the conjugation surface on the reduction side is constant.

The driving member can further achieve the auto-focus function, which can be a voice coil motor (VCM), a micro electro-mechanical system (MEMS), a piezoelectric system or a shape memory alloy, etc. The mechanical member can control the passing range of the light through the projection lens system. Preferably, the mechanical member can be disposed on the magnification side of the focus tunable component and the lens assembly.

The focus tunable component or the driving member or the combination thereof can provide a preferable projection position of the projection lens system, so as to obtain clear projection image of the object under different environments. Moreover, the projection apparatus includes a high directivity (low divergence) and a high intensity light source, wherein the light source can be a laser, SLED, Micro-LED, RCLED, vertical-cavity surface-emitting laser (VCSEL), etc., and the light source can be a single light source or multiple light sources disposed on the reduction side of the lens assembly, so as to provide high projection quality. When the light source of the projection apparatus is a vertical-cavity surface-emitting laser and disposed on the conjugation surface on the reduction side of the projection lens system, it is favorable for providing a high directivity, low divergence and high intensity light source by proper light arrangement, so as to increase the illuminance of the projection surface.

Furthermore, the present disclosure will not be limited to two modes (such as Mode 1 and Mode 2 stated in the following embodiments) under different environments, but can further provide three or more modes, so as to maintain high quality under different conditions.

According to the present disclosure, a sensing module includes a projection apparatus and an image sensing apparatus, wherein the projection apparatus includes the aforementioned projection lens system and at least one light source, the image sensing apparatus includes an imaging lens system and an image sensor disposed on an image surface of the imaging lens system. The imaging lens system is for receiving information on the conjugation surface on the magnification side of the projection lens system, and then for imaging the information on the image sensor. The projection lens system can include a diffractive optical element, a focus tunable component and a lens assembly. The light source can be composed by a laser array, which can be formed into a structured light through the projection lens system, and projected on a sensed object. The imaging lens system can receive the reflective light from the sensed object, and the received information can be calculated by the processor so as to obtain the relative distance of each portion of the sensed object, further obtain the 3D-shaped variation on the surface of the sensed object.

Furthermore, the light can be projected on the projection surface evenly by the arrangement of the diffractive optical element.

According to the present disclosure, an electronic device is provided, which includes the aforementioned sensing module. Preferably, the electronic device can further include but not limited to a control unit, a display, a storage unit, a random access memory unit (RAM) or a combination thereof. The electronic device can be motion-sensing games, virtual reality, 3D image capturing devices, face recognition, driving assisting systems, intelligent electronic devices, multiple lens devices, wearable devices, digital cameras, image recognition systems, entertainment systems, sporting cameras and intelligent home assisting systems.

According to the above description of the present disclosure, the following 1st-8th specific embodiments are provided for further explanation.

1st Embodiment

Figure 2A:
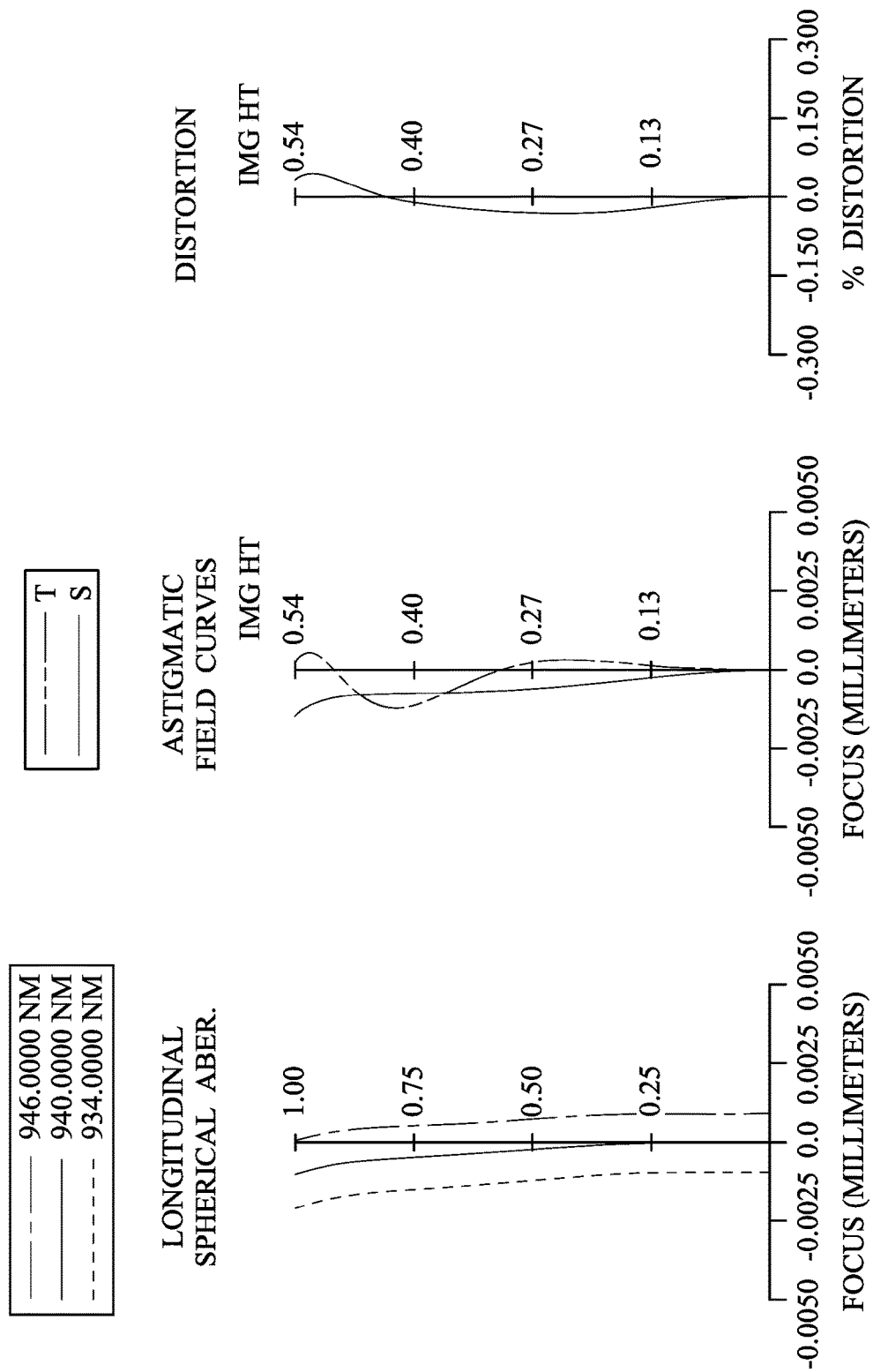
FIG. 2A shows spherical aberration curves, astigmatic field curves and a distortion curve of Mode 1 of the projection apparatus according to the 1st embodiment.
Figure 2B:
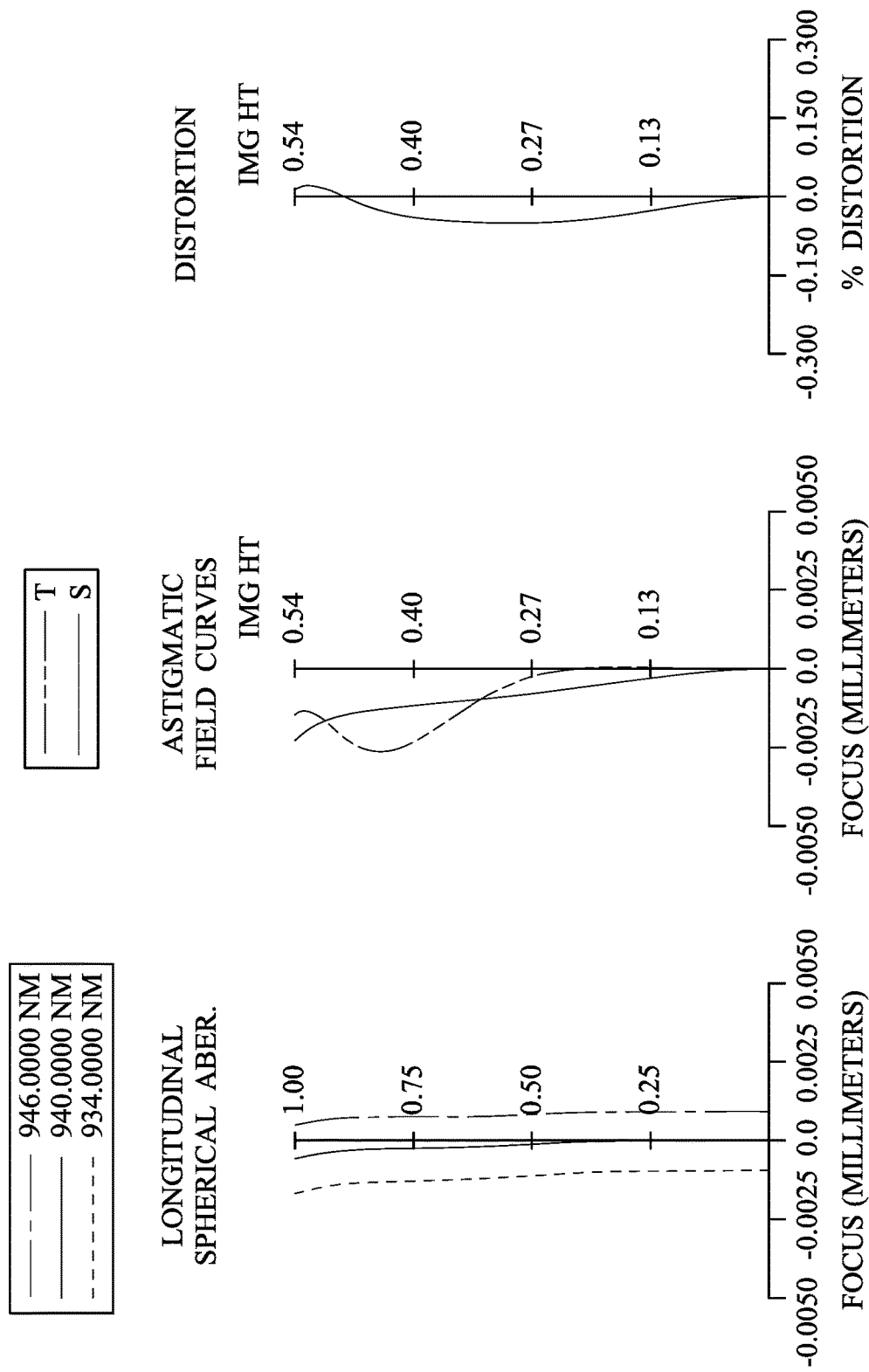
FIG. 2B shows spherical aberration curves, astigmatic field curves and a distortion curve of Mode 2 of the projection apparatus according to the 1st embodiment.

FIG. 1 is a schematic view of a projection apparatus according to the 1st embodiment of the present disclosure. FIG. 2A shows spherical aberration curves, astigmatic field curves and a distortion curve of Mode 1 of the projection apparatus according to the 1st embodiment, and FIG. 2B shows spherical aberration curves, astigmatic field curves and a distortion curve of Mode 2 of the projection apparatus according to the 1st embodiment, wherein Mode 1 and Mode 2 are two modes of the projection apparatus under the focusing conditions at temperatures of 20° C. and 50° C., respectively, and the corresponding parameter variations are shown in Table 1C below. In FIG. 1, the projection apparatus according to the 1st embodiment includes a projection lens system (its reference numeral is omitted) and a light source (its reference numeral is omitted), wherein the projection lens system has a magnification side and a reduction side, the light source is disposed on a conjugation surface 160 on the reduction side of the projection lens system, and the projection lens system projects light from the conjugation surface 160 on the reduction side onto a conjugation surface on the magnification side. In the 1st embodiment, the light source can be a vertical-cavity surface-emitting laser. The projection lens system includes, in order from the magnification side to the reduction side, an aperture stop 100, a diffractive optical element (DOE) 170, a focus tunable component 180 and a lens assembly 10, wherein the lens assembly 10 includes a first lens element 110, a second lens element 120, a third lens element 130, a fourth lens element 140 and a fifth lens element 150, and the diffractive optical element 170 and the focus tunable component 180 are disposed on a magnification side of the lens assembly 10. In detail, the first lens element 110, the second lens element 120, the third lens element 130, the fourth lens element 140 and the fifth lens element 150 in the lens assembly 10 can be divided into three lens groups, that is, the lens assembly 10 can include three lens groups, which are, in order from the magnification side to the reduction side, a first lens group having positive refractive power, a second lens group having negative refractive power and a third lens group having positive refractive, power, wherein the first lens group can include the first lens element 110, the second lens group can include the second lens element 120, or can include the second lens element 120 and the third lens element 130, or can include the second lens element 120, the third lens element 130 and the fourth lens element 140, the third lens group can include the third lens element 130, the fourth lens element 140 and the fifth lens element 150, or can include the fourth lens element 140 and the fifth lens element 150, or can include the fifth lens element 150.

The first lens element 110 with positive refractive power has a magnification-side surface 111 being convex and a reduction-side surface 112 being concave. The first lens element 110 is made of a plastic material, and has the magnification-side surface 111 and the reduction-side surface 112 being both aspheric.

The second lens element 120 with negative refractive power has a magnification-side surface 121 being convex and a reduction-side surface 122 being concave. The second lens element 120 is made of a plastic material, and has the magnification-side surface 121 and the reduction-side surface 122 being both aspheric.

The third lens element 130 with positive refractive power has a magnification-side surface 131 being convex and a reduction-side surface 132 being concave. The third lens element 130 is made of a plastic material, and has the magnification-side surface 131 and the reduction-side surface 132 being both aspheric.

The fourth lens element 140 with positive refractive power has a magnification-side surface 141 being concave and a reduction-side surface 142 being convex. The fourth lens element 140 is made of a plastic material, and has the magnification-side surface 141 and the reduction-side surface 142 being both aspheric.

The fifth lens element 150 with positive refractive power has a magnification-side surface 151 being concave and a reduction-side surface 152 being convex. The fifth lens element 150 is made of a plastic material, and has the magnification-side surface 151 and the reduction-side surface 152 being both aspheric. Furthermore, the magnification-side surface 151 of the fifth lens element 150 includes at least one inflection point.

The diffractive optical element 170 is disposed between the aperture stop 100 and the focus tunable component 180, and is made of $SiO_2$.

The focus tunable component 180 can be can be a liquid lens set, a liquid crystal lens set or other optical element set which can provide auto-focus function and can change the focal length of the projection lens system by external controlling unit (such as circuit, pressure etc.). In detail, FIG. 11A is a schematic view of the focus tunable component 180 being a liquid lens set according to the 1st embodiment, FIG. 11B is a schematic view of the focus tunable component 180 being another liquid lens set according to the 1st embodiment, and FIG. 11C is a schematic view of the focus tunable component 180 being a liquid crystal lens set according to the 1st embodiment. In FIG. 11A, the focus tunable component 180 is a liquid lens set, which include a glass substrate 180a, a liquid material 180b, a flexible membrane 180c and a piezoelectric material 180d, wherein the glass substrate 180a is filled with the liquid material 180b, one side of the flexible membrane 180c is connected to the glass substrate 180a and the liquid material 180b, the other side of the flexible membrane 180c is connected to the piezoelectric material 180d. When the external pressure is exerted on the piezoelectric material 180d, the focal length of the focus tunable component 180 can be changed so as to adjust the focal length of the projection lens system. In FIG. 11B, the focus tunable component 180 is another liquid lens set, which include a glass substrate 180e, a first liquid material 180f, a second liquid material 180g and a controlling circuit 180h, wherein the glass substrate 180e is filled with the first liquid material 180f and the second liquid material 180g from the magnification side to the reduction side, and the controlling circuit 180h is connected to the glass substrate 180e for providing the voltage to change the focal length of the focus tunable component 180. In FIG. 11C, the focus tunable component 180 is a liquid crystal lens set, which includes two liquid crystal lens elements 180i, 180j and two controlling circuit 180k, 180m, wherein each of the liquid crystal lens elements 180*i*, 180*j* includes a glass substrate (its reference numeral is omitted) and a liquid crystal material (its reference numeral is omitted) filled therein, the two liquid crystal lens elements 180*i*, 180*j* are connected to each other, and are connected to the two controlling circuit 180*k*, 180*m*, respectively. The focal length of the focus tunable component 180 can be adjusted by exerting the voltage for changing the focal length of the liquid crystal lens elements 180*i*, 180*j*. According to the 1st embodiment, the focus tunable component 180 is a liquid lens set, and the detailed optical data and parameters of the focus tunable component 180 are disclosed in the Tables 1A, 1C and 1D below.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

The detailed optical data of the 1st embodiment are shown in Table 1A and the aspheric surface data are shown in Table 1B below.

TABLE 1A

1st Embodiment

| Surface # | | Curvature Radius | | Thickness | Material | Index | Abbe # | Focal Length | (dn/dt) × 10$^{-6}$ (1/° C.) |
|---|---|---|---|---|---|---|---|---|---|
| 0 | Object | Plano | | 750.000 | | | | | |
| 1 | Ape. Stop | Plano | | 0.015 | | | | | |
| 2 | DOE | Plano | | 0.260 | SiO$_2$ | 1.451 | 67.8 | — | — |
| 3 | | Plano | | 0.020 | | | | | |
| 4 | Focus Tunable Component | Plano | | 0.340 | Polymer | 1.616 | 23.3 | ft | — |
| 5 | | Rt | | 0.080 | | | | | |
| 6 | Lens 1 | 1.206 | ASP | 0.450 | Plastic | 1.641 | 19.5 | 2.35 | −115.0 |
| 7 | | 5.143 | ASP | 0.055 | | | | | |
| 8 | Lens 2 | 2.563 | ASP | 0.300 | Plastic | 1.641 | 19.5 | −2.24 | −115.0 |
| 9 | | 0.877 | ASP | 0.050 | | | | | |
| 10 | Lens 3 | 0.729 | ASP | 0.750 | Plastic | 1.535 | 56.0 | 2.49 | −106.1 |
| 11 | | 1.032 | ASP | 0.392 | | | | | |
| 12 | Lens 4 | −0.655 | ASP | 0.341 | Plastic | 1.618 | 22.5 | 33.95 | −118.0 |
| 13 | | −0.761 | ASP | 0.083 | | | | | |
| 14 | Lens 5 | −0.929 | ASP | 0.730 | Plastic | 1.618 | 22.5 | 3.52 | −118.0 |
| 15 | | −0.847 | ASP | 0.199 | | | | | |
| 16 | Light Source | Plano | | — | | | | | |

Reference wavelength is 940.0 nm

TABLE 1B

Aspheric Coefficients

| Surface # | 6 | 7 | 8 | 9 | 10 |
|---|---|---|---|---|---|
| k = | −2.8342E−02 | −1.1217E+01 | −1.0935E−01 | 3.4977E−01 | −1.7596E−01 |
| A4 = | −1.0088E−02 | −1.9506E−02 | 9.8460E−03 | −2.9850E−03 | −4.8239E−02 |
| A6 = | −7.9680E−03 | 1.1006E−02 | −5.4974E−02 | −5.8890E−02 | 9.1873E−02 |
| A8 = | 9.9676E−03 | −5.0397E−02 | −1.2344E−01 | −6.1677E−02 | 7.1319E−02 |
| A10 = | | | | | 8.9878E−01 |

| Surface # | 11 | 12 | 13 | 14 | 15 |
|---|---|---|---|---|---|
| k = | −2.3361E+00 | 4.4140E−01 | −1.2875E+00 | −8.0823E+00 | 2.5066E−01 |
| A4 = | −7.0939E−03 | −6.1346E−01 | 1.9097E+00 | 9.9959E−01 | 1.9403E−01 |
| A6 = | −1.0771E+00 | 3.8544E+00 | 4.5155E+00 | 3.7737E+00 | −4.8913E−03 |
| A8 = | −4.9712E+00 | −4.2897E+01 | 3.2107E+00 | −1.2239E+01 | 2.1090E−01 |
| A10 = | | −5.7945E+01 | | 5.3060E+00 | 1.1654E+00 |

In Table 1A, the curvature radius, the thickness and the focal length are shown in millimeters (mm). Surface numbers 0-16 represent the surfaces sequentially arranged from the magnification side to the reduction side along the optical axis. In Table 1B, k represents the conic coefficient of the equation of the aspheric surface profiles. A4-A10 represent the aspheric coefficients ranging from the 4th order to the 10th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

According to the 1st embodiment, a focal length of the projection lens system is f, an f-number of the projection lens system is Fno, half of a maximum field of view of the projection lens system is HFOV, a focal length of the focus tunable component 180 is ft, a curvature radius of a surface of the focus tunable component 180 which is variable according to different modes is Rt, the values of the parameters under Mode 1 and Mode 2 are shown in Table 1C below.

TABLE 1C

1st Embodiment

|  | Mode 1 (20° C.) | Mode 2 (50° C.) |
|---|---|---|
| f | 3.49 | 3.49 |
| Fno | 2.87 | 2.87 |
| HFOV (deg.) | 8.8 | 8.8 |
| ft | Infinity | 486.89 |
| Rt | Infinity | −300.000 |

Figure 12:
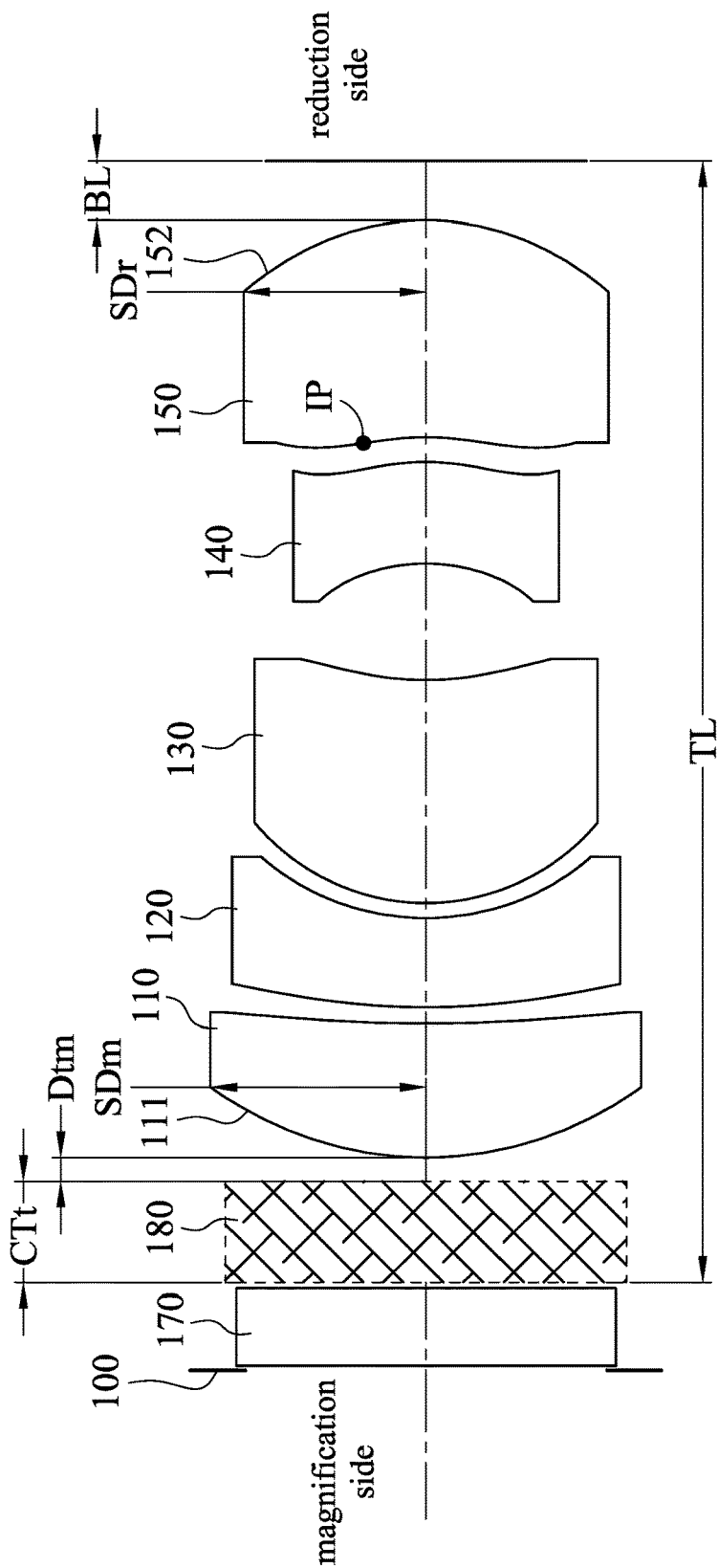
FIG. 12 is a schematic view of parameters of the projection apparatus according to the 1st embodiment of FIG. 1.

FIG. 12 is a schematic view of parameters of the projection apparatus according to the 1st embodiment of FIG. 1, wherein the leftmost end of the projection apparatus is a magnification side, and the rightmost end of the projection apparatus is a reduction side. According to the 1st embodiment, half of a maximum field of view of the projection lens system is HFOV, a wavelength of light incident into the projection lens system is A, an axial distance between the focus tunable component 180 and one of the lens elements closest to the magnification side in the lens assembly 10 (which is the first lens element 110) is Dtm, a central thickness of the focus tunable component 180 is CTt, a curvature radius of a reduction-side surface of one of the lens elements closest to the reduction side in the lens assembly 10 (which is the fifth lens element 150) is Rr, a curvature radius of a magnification-side surface of the lens element closest to the magnification side in the lens assembly 10 (which is the first lens element 110) is Rm, a sum of central thicknesses of the lens elements (which are the first lens element 110, the second lens element 120, the third lens element 130, the fourth lens element 140 and the fifth lens element 150) in the lens assembly 10 is ΣCTa, the focal length of the projection lens system is f, the focal length of the focus tunable component 180 is ft, a focal length of the lens assembly 10 is fa, a focal length of the focus tunable component 180 at a temperature of 50° C. (which is under Mode 2) is ft50, a projection distance on the magnification side of the projection lens system is OBJ, an axial distance between a reduction-side surface of the lens element closest to the reduction side in the lens assembly 10 (which is the fifth lens element 150) and the conjugation surface on the reduction side is BL, a magnification-side surface of the lens element closest to the magnification side in the lens assembly 10 (which is the first lens element 110) and the conjugation surface on the reduction side is TL, a diameter of the aperture stop 100 is DS, a maximum value of effective radii of all surfaces of the lens elements in the lens assembly 10 (which are the magnification-side surface 111 of the first lens element 110, the reduction-side surface 112 of the first lens element 110, the magnification-side surface 121 of the second lens element 120, the reduction-side surface 122 of the second lens element 120, the magnification-side surface 131 of the third lens element 130, the reduction-side Jo surface 132 of the third lens element 130, the magnification-side surface 141 of the fourth lens element 140, the reduction-side surface 142 of the fourth lens element 140, the magnification-side surface 151 of the fifth lens element 150, and the reduction-side surface 152 of the fifth lens element 150) is SDmax, a vertical distance between a position of an inflection point IP on the magnification-side surface of the lens element closest to the reduction side in the lens assembly 10 (which is the fifth lens element 150) and the optical axis is Yp1, a maximum effective diameter of the light source is DL, a maximum value of refractive indices of materials of the focus tunable component 180 and the lens elements of the lens assembly 10 (which are the first lens element 110, the second lens element 120, the third lens element 130, the fourth lens element 140 and the fifth lens element 150) is Nmax, an optical distortion of an effective radius position on the conjugation surface on the reduction side of the projection lens system is DIST, a total number of the lens elements in the lens assembly 10 is N. These parameters can be calculated from Table 1A, Table 1B and Table 1C as the following values and satisfy the following conditions in Table 1D under Mode 1 and Mode 2.

TABLE 1D

1st Embodiment

|  | Mode 1 | Mode 2 |  | Mode 1 | Mode 2 |
|---|---|---|---|---|---|
| tan(HFOV) | 0.15 | 0.15 | BL/f | 0.057 | 0.057 |
| λ [nm] | 940.0 |  | TL/DS | 3.10 | 3.10 |
| Dtm/CTt | 0.24 |  | SDr/SDm | 0.85 | 0.84 |
| (Rr + Rm)/(Rr − Rm) | −0.18 |  | SDmax [mm] | 0.72 | 0.72 |
| ΣCTa [mm] | 2.57 |  | Yp1/f | 0.06 | 0.06 |
| f/Rm | 2.90 | 2.89 | Yp2/f | — | — |
| |Δ(f/ft)| | 0.007 |  | DL [mm] | 1.08 | 1.09 |
| |fa/ft| | 0.000 | 0.007 | Nmax | 1.641 | |
| |ft50/(100×f)| | Infinity | 1.394 | |DIST| | 0.03% | 0.01% |
| 10×f/OBJ | 0.047 | 0.047 | N | 5 | |

2nd Embodiment

Figure 3:
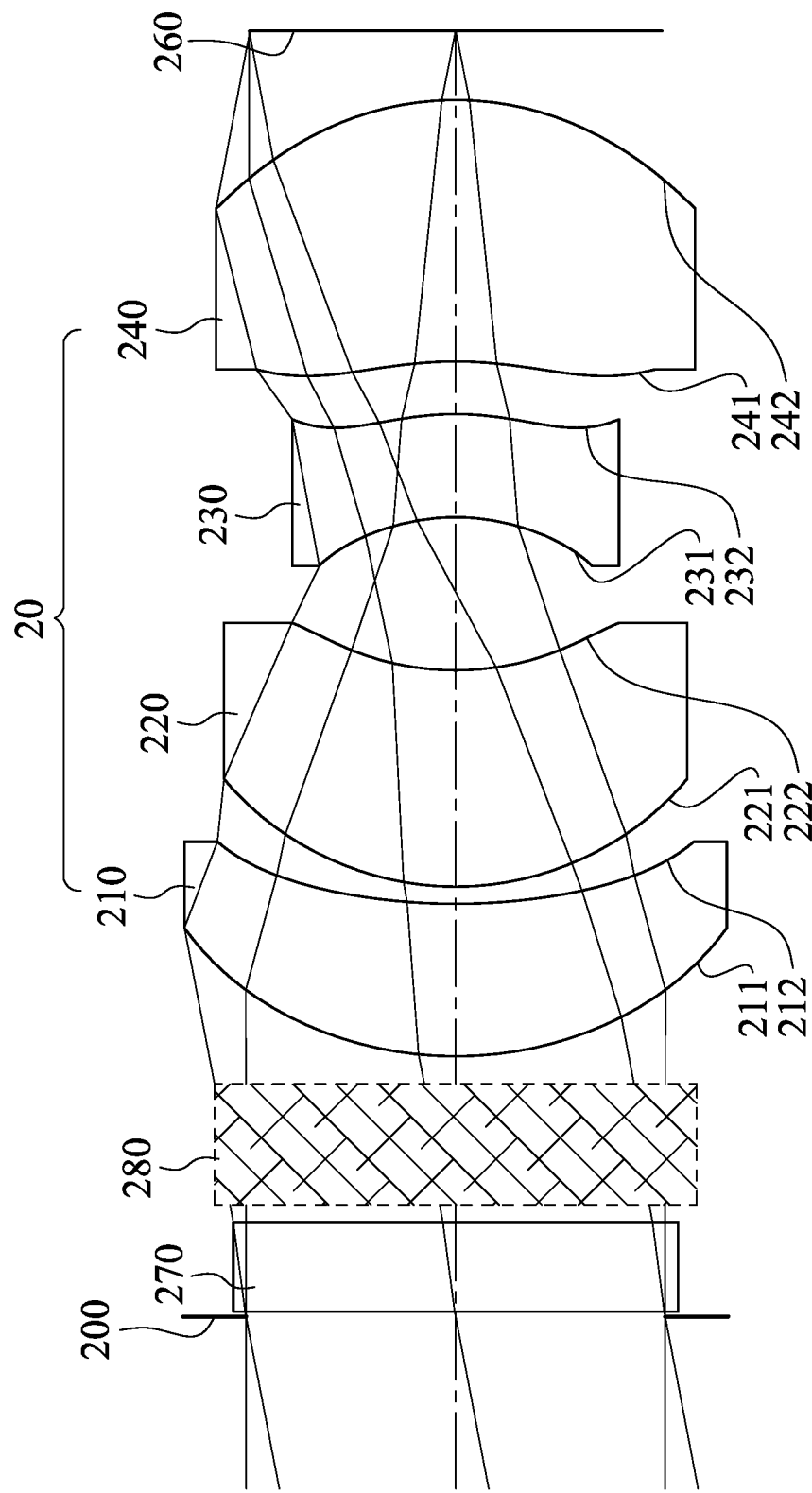
FIG. 3 is a schematic view of a projection apparatus according to the 2nd embodiment of the present disclosure.
Figure 4A:
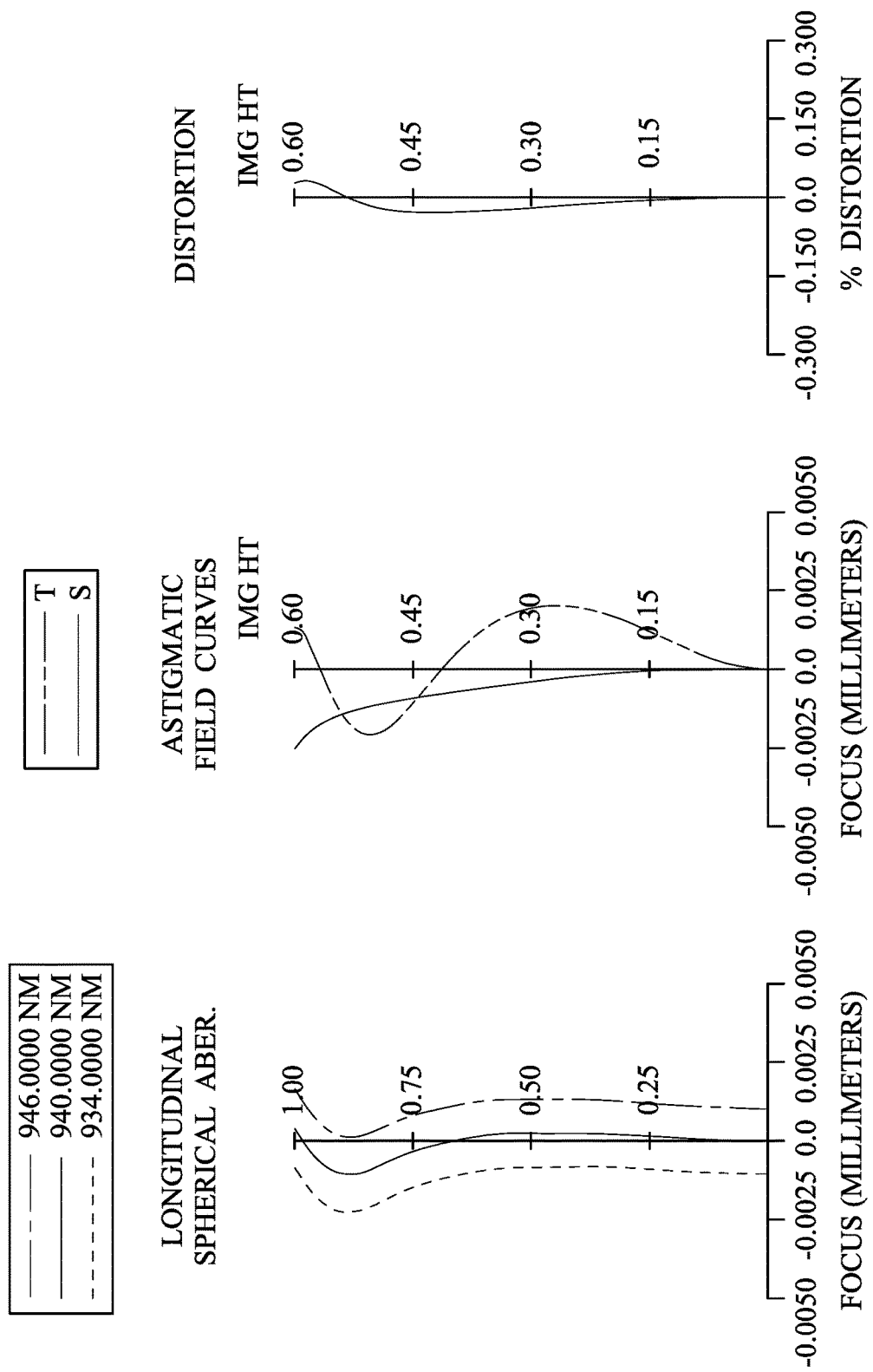
FIG. 4A shows spherical aberration curves, astigmatic field curves and a distortion curve of Mode 1 of the projection apparatus according to the 2nd embodiment.
Figure 4B:
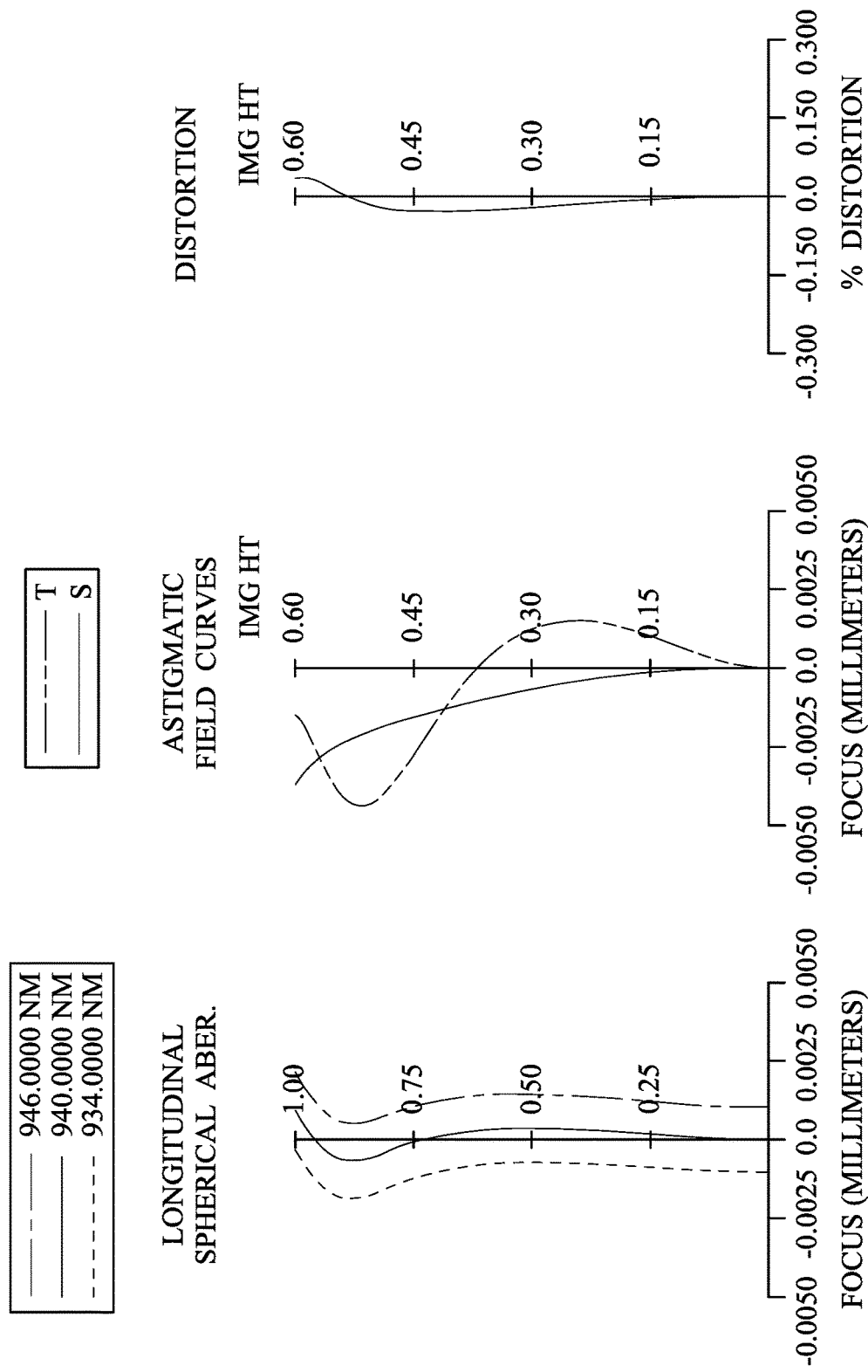
FIG. 4B shows spherical aberration curves, astigmatic field curves and a distortion curve of Mode 2 of the projection apparatus according to the 2nd embodiment.

FIG. 3 is a schematic view of a projection apparatus according to the 2nd embodiment of the present disclosure. FIG. 4A shows spherical aberration curves, astigmatic field curves and a distortion curve of Mode 1 of the projection apparatus according to the 2nd embodiment, and FIG. 4B shows spherical aberration curves, astigmatic field curves and a distortion curve of Mode 2 of the projection apparatus according to the 2nd embodiment, wherein Mode 1 and Mode 2 are two modes of the projection apparatus under the focusing conditions at temperatures of 20° C. and 50° C., respectively, and the corresponding parameter variations are shown in Table 2C below. In FIG. 3, the projection apparatus according to the 2nd embodiment includes a projection lens system (its reference numeral is omitted) and a light source (its reference numeral is omitted), wherein the projection lens system has a magnification side and a reduction side, the light source is disposed on a conjugation surface 260 on the reduction side of the projection lens system, and the projection lens system projects light from the conjugation surface 260 on the reduction side onto a conjugation surface on the magnification side. In the 2nd embodiment, the light source can be a vertical-cavity surface-emitting laser. The projection lens system includes, in order from the magnification side to the reduction side, an aperture stop 200, a diffractive optical element 270, a focus tunable component 280 and a lens assembly 20, wherein the lens assembly 20 includes a first lens element 210, a second lens element 220, a third lens element 230 and a fourth lens element 240, and the diffractive optical element 270 and the focus tunable component 280 are disposed on a magnification side of the lens assembly 20. In detail, the first lens element 210, the second lens element 220, the third lens element 230 and the fourth lens element 240 in the lens assembly 20 can be divided into three lens groups, that is, the lens assembly 20 can include three lens groups, which are, in order from the magnification side to the reduction side, a first lens group having positive refractive power, a second lens group having negative refractive power and a third lens group having positive refractive power, wherein the first lens group can include the first lens element 210 and the second lens element 220, the second lens group can include the third lens element 230, the third lens group can include the fourth lens element 240.

The first lens element 210 with positive refractive power has a magnification-side surface 211 being convex and a reduction-side surface 212 being concave. The first lens element 210 is made of a plastic material, and has the magnification-side surface 211 and the reduction-side surface 212 being both aspheric.

The second lens element 220 with positive refractive power has a magnification-side surface 221 being convex and a reduction-side surface 222 being concave. The second lens element 220 is made of a plastic material, and has the magnification-side surface 221 and the reduction-side surface 222 being both aspheric.

The third lens element 230 with negative refractive power has a magnification-side surface 231 being concave and a reduction-side surface 232 being convex. The third lens element 230 is made of a plastic material, and has the magnification-side surface 231 and the reduction-side surface 232 being both aspheric.

The fourth lens element 240 with positive refractive power has a magnification-side surface 241 being concave and a reduction-side surface 242 being convex. The fourth lens element 240 is made of a plastic material, and has the magnification-side surface 241 and the reduction-side surface 242 being both aspheric. Furthermore, the magnification-side surface 241 of the fourth lens element 240 includes at least one inflection point.

The diffractive optical element 270 is disposed between the aperture stop 200 and the focus tunable component 280, and is made of $SiO_2$.

According to the 2nd embodiment, the focus tunable component 280 is a liquid lens set and the detailed optical data and parameters thereof are disclosed in Tables 2A, 2C and 2D below.

The detailed optical data of the 2nd embodiment are shown in Table 2A and the aspheric surface data are shown in Table 2B below.

TABLE 2A

2nd Embodiment

| Surface # | | Curvature Radius | Thickness | Material | Index | Abbe # | Focal Length | (dn/dt) ×10⁻⁵ (1/° C.) |
|---|---|---|---|---|---|---|---|---|
| 0 | Object | Plano | 600.000 | | | | | |
| 1 | Ape. Stop | Plano | 0.015 | | | | | |
| 2 | DOE | Plano | 0.260 | $SiO_2$ | 1.451 | 67.8 | — | — |
| 3 | | Plano | 0.050 | | | | | |
| 4 | Focus Tunable Component | Rt | 0.352 | Polymer | 1.508 | 64.2 | ft | — |
| 5 | | Plano | 0.080 | | | | | |
| 6 | Lens 1 | 1.089 ASP | 0.443 | Plastic | 1.641 | 19.5 | 3.46 | −115.0 |
| 7 | | 1.798 ASP | 0.050 | | | | | |
| 8 | Lens 2 | 0.861 ASP | 0.629 | Plastic | 1.536 | 56.1 | 7.54 | −106.1 |
| 9 | | 0.816 ASP | 0.445 | | | | | |
| 10 | Lens 3 | −0.639 ASP | 0.300 | Plastic | 1.618 | 22.5 | −10.25 | −118.0 |
| 11 | | −0.838 ASP | 0.153 | | | | | |
| 12 | Lens 4 | −1.119 ASP | 0.760 | Plastic | 1.618 | 22.5 | 2.93 | −118.0 |
| 13 | | −0.871 ASP | 0.201 | | | | | |
| 14 | Light Source | Plano | — | | | | | |

Reference wavelength is 940.0 nm

TABLE 2B

Aspheric Coefficients

| | Surface # | | | |
|---|---|---|---|---|
| | 6 | 7 | 8 | 9 |
| k = | 1.0563E−01 | 1.0342E+00 | −1.3046E−01 | −7.4496E−01 |
| A4 = | 1.5250E−02 | 1.0738E−02 | −3.5822E−02 | 3.0170E−01 |
| A6 = | 8.6299E−03 | 6.1301E−02 | −1.9060E−03 | −3.8235E−01 |
| A8 = | 3.9978E−02 | 2.2670E−01 | 1.0143E−01 | 1.7018E+00 |
| A10 = | 9.6474E−02 | 5.2872E−01 | 2.5714E−01 | −3.2807E+01 |
| A12 = | 8.2394E−02 | 1.1756E−01 | | |

| | Surface # | | | |
|---|---|---|---|---|
| | 10 | 11 | 12 | 13 |
| k = | 2.5859E−01 | −7.5435E−01 | −2.0595E+00 | 4.8649E−02 |
| A4 = | 3.0470E−01 | 1.6966E+00 | 1.0430E+00 | 6.5163E−02 |

TABLE 2B-continued

| Aspheric Coefficients | | | | |
|---|---|---|---|---|
| A6 = | 4.9600E+00 | 3.8749E+00 | −5.9033E−01 | −4.9635E−02 |
| A8 = | −2.6959E+01 | 1.2713E+01 | 9.4912E+00 | 5.5285E−01 |
| A10 = | −9.4032E+01 | −7.1634E+01 | −3.3674E+01 | −7.7856E−01 |
| A12 = | | | 3.1745E+01 | 1.3971E+00 |

In the 2nd embodiment, the equation of the aspheric surface profiles of the aforementioned lens elements is the same as the equation of the 1st embodiment. Also, the definitions of these parameters shown in the following Table 2C and Table 2D are the same as those stated in the 1st embodiment with corresponding values for the 2nd embodiment, so an explanation in this regard will not be provided again.

Moreover, in the 2nd embodiment, the values of the parameters under Mode 1 and Mode 2 are shown in Tables 2C and 2D below.

TABLE 2C

| 2nd Embodiment | | |
|---|---|---|
| | Mode 1 (20° C.) | Mode 2 (50° C.) |
| f | 3.12 | 3.12 |
| Fno | 2.56 | 2.56 |
| HFOV (deg.) | 10.9 | 10.9 |
| ft | Infinity | 413.08 |
| Rt | Infinity | 210.000 |

TABLE 2D

| 2nd Embodiment | | | | | |
|---|---|---|---|---|---|
| | Mode 1 | Mode 2 | | Mode 1 | Mode 2 |
| tan(HFOV) | 0.19 | 0.19 | BL/f | 0.064 | 0.064 |
| λ [nm] | 940.0 | | TL/DS | 2.80 | 2.80 |
| Dtm/Ctt | 0.23 | | SDr/SDm | 0.88 | 0.88 |
| (Rr + Rm)/(Rr − Rm) | −0.11 | | SDmax [nm] | 0.79 | 0.79 |
| ΣCTa [mm] | 2.13 | | Yp1/f | 0.08 | 0.08 |
| f/Rm | 2.87 | 2.87 | Yp2/f | — | — |
| |Δ(f/ft)| | 0.008 | | DL [mm] | 1.20 | 1.21 |
| |fa/ft| | 0.000 | 0.008 | Nmax | 1.641 | |
| |ft50/(100×f)| | Infinity | 1.324 | |DIST| | 0.03% | 0.03% |
| 10×f/OBJ | 0.052 | 0.052 | N | 4 | |

3rd Embodiment

Figure 5:
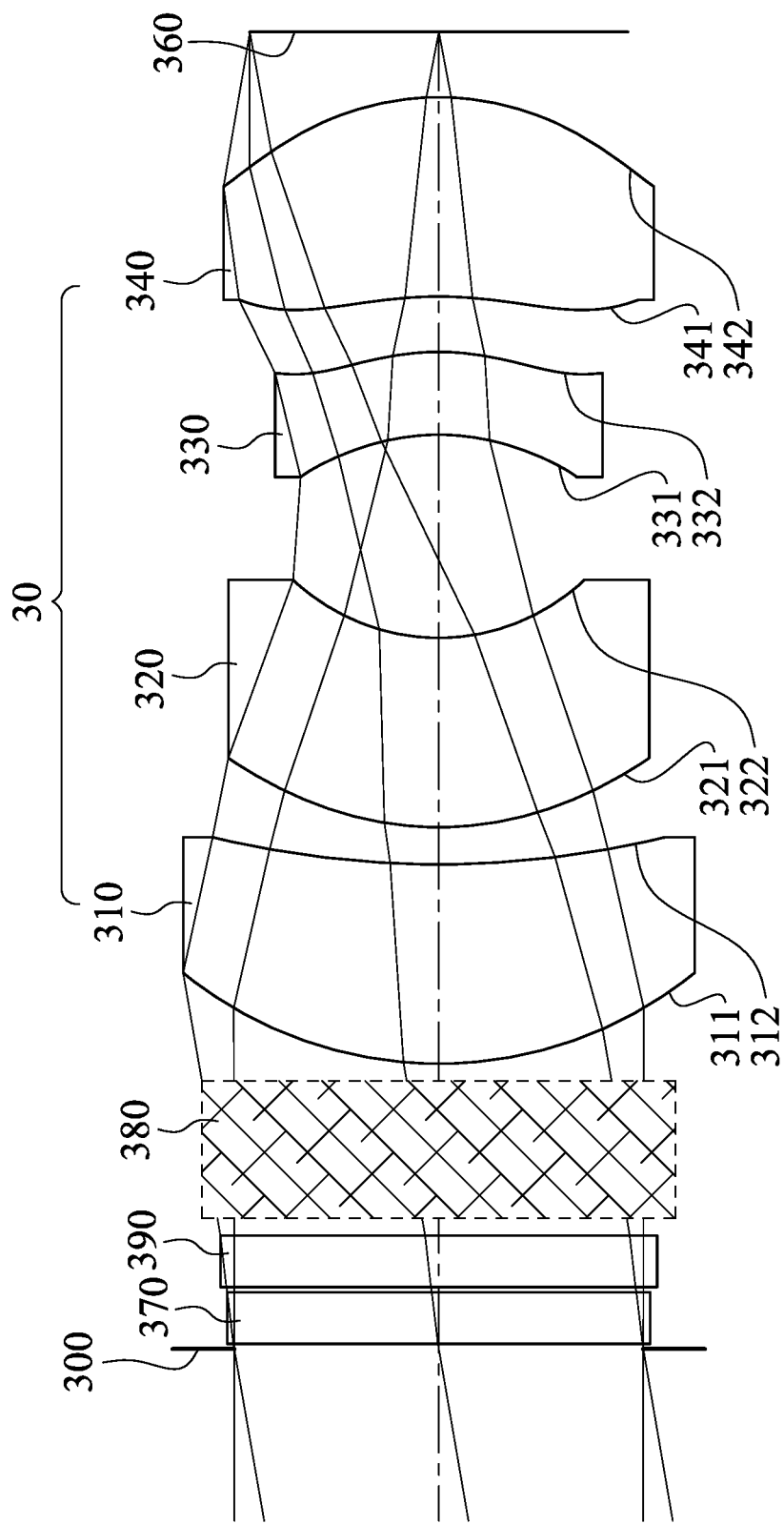
FIG. 5 is a schematic view of a projection apparatus according to the 3rd embodiment of the present disclosure.
Figure 6A:
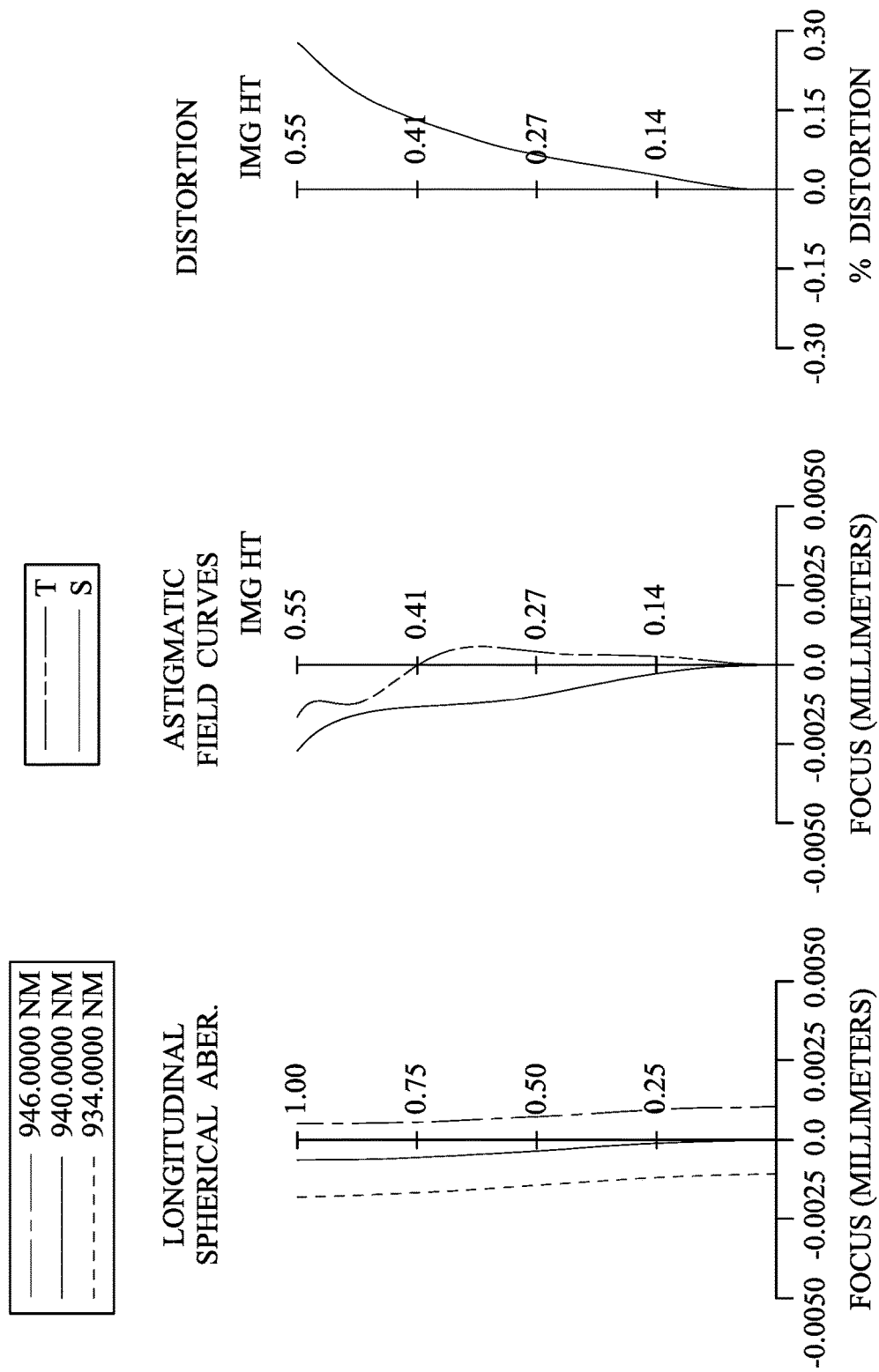
FIG. 6A shows spherical aberration curves, astigmatic field curves and a distortion curve of Mode 1 of the projection apparatus according to the 3rd embodiment.
Figure 6B:
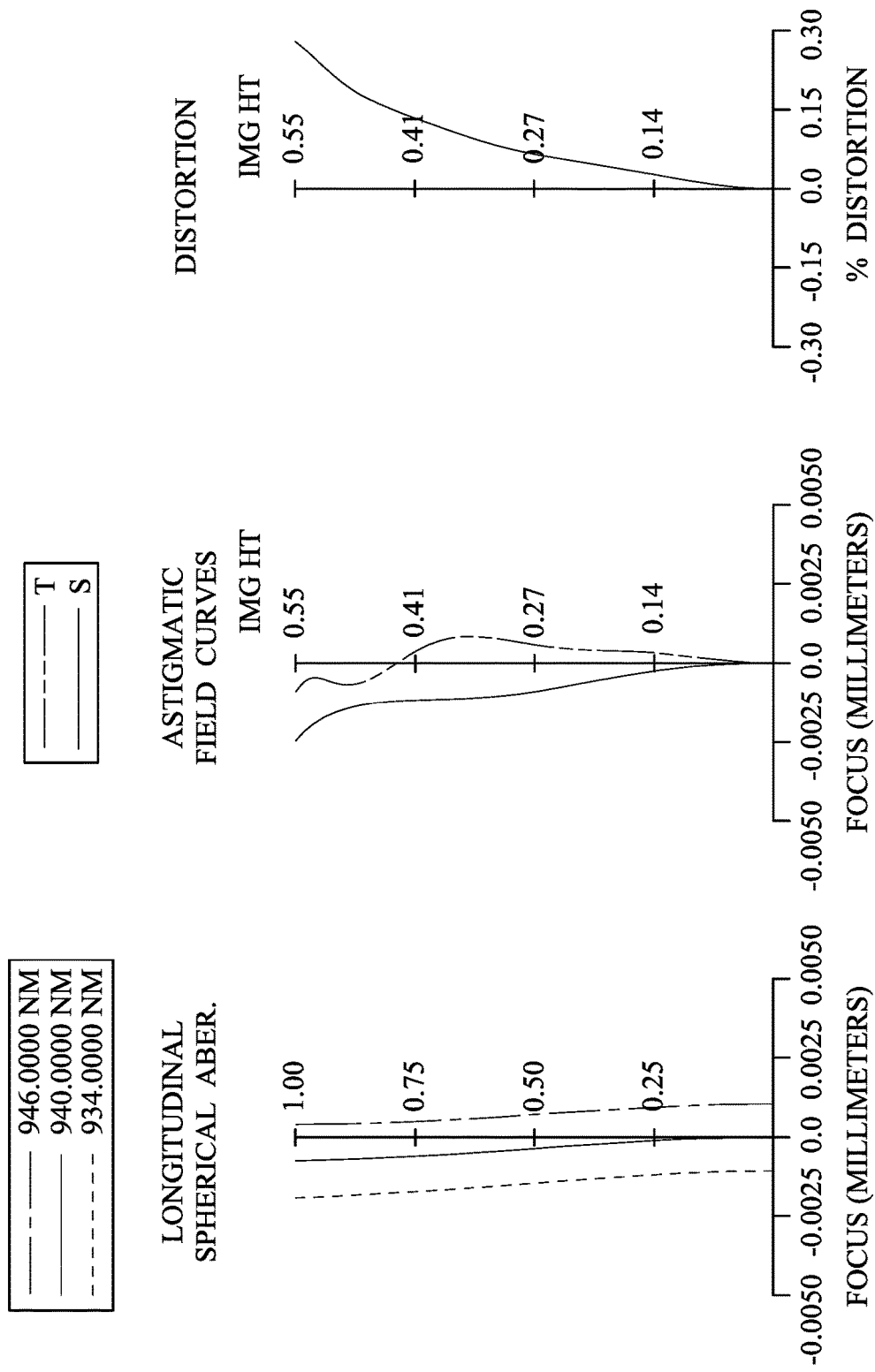
FIG. 6B shows spherical aberration curves, astigmatic field curves and a distortion curve of Mode 2 of the projection apparatus according to the 3rd embodiment.

FIG. 5 is a schematic view of a projection apparatus according to the 3rd embodiment of the present disclosure. FIG. 6A shows spherical aberration curves, astigmatic field curves and a distortion curve of Mode 1 of the projection apparatus according to the 3rd embodiment, and FIG. 6B shows spherical aberration curves, astigmatic field curves and a distortion curve of Mode 2 of the projection apparatus according to the 3rd embodiment, wherein Mode 1 and Mode 2 are two modes of the projection apparatus under the focusing conditions at temperatures of 20° C. and 50° C., respectively, and the corresponding parameter variations are shown in Table 3C below. In FIG. 5, the projection apparatus according to the 3rd embodiment includes a projection lens system (its reference numeral is omitted) and a light source (its reference numeral is omitted), wherein the projection lens system has a magnification side and a reduction side, the light source is disposed on a conjugation surface 360 on the reduction side of the projection lens system, and the projection lens system projects light from the conjugation surface 360 on the reduction side onto a conjugation surface on the magnification side. In the 3rd embodiment, the light source can be a vertical-cavity surface-emitting laser. The projection lens system includes, in order from the magnification side to the reduction side, an aperture stop 300, a diffractive optical element 370, a cover glass 390, a focus tunable component 380 and a lens assembly 30, wherein the lens assembly 30 includes a first lens element 310, a second lens element 320, a third lens element 330 and a fourth lens element 340, and the diffractive optical element 370, the cover glass 390 and the focus tunable component 380 are disposed on a magnification side of the lens assembly 30. In detail, the first lens element 310, the second lens element 320, the third lens element 330 and the fourth lens element 340 in the lens assembly 30 can be divided into three lens groups, that is, the lens assembly 30 can include three lens groups, which are, in order from the magnification side to the reduction side, a first lens group having positive refractive power, a second lens group having negative refractive power and a third lens group having positive refractive power, wherein the first lens group can include the first lens element 310, the second lens group can include the second lens element 320, or can include the second lens element 320 and the third lens element 330, the third lens group can include the third lens element 330 and the fourth lens element 340, or can include the fourth lens element 340.

The first lens element 310 with positive refractive power has a magnification-side surface 311 being convex and a reduction-side surface 312 being concave. The first lens element 310 is made of a glass material, and has the magnification-side surface 311 and the reduction-side surface 312 being both spherical.

The second lens element 320 with negative refractive power has a magnification-side surface 321 being convex and a reduction-side surface 322 being concave. The second lens element 320 is made of a plastic material, and has the magnification-side surface 321 and the reduction-side surface 322 being both aspheric.

The third lens element 330 with positive refractive power has a magnification-side surface 331 being concave and a reduction-side surface 332 being convex. The third lens element 330 is made of a plastic material, and has the magnification-side surface 331 and the reduction-side surface 332 being both aspheric.

The fourth lens element 340 with positive refractive power has a magnification-side surface 341 being concave and a reduction-side surface 342 being convex. The fourth lens element 340 is made of a plastic material, and has the magnification-side surface 341 and the reduction-side surface 342 being both aspheric. Furthermore, each of the magnification-side surface 341 and the reduction-side surface 342 of the fourth lens element 340 includes at least one inflection point.

The diffractive optical element 370 is disposed between the aperture stop 300 and the cover glass 390, and is made of $SiO_2$.

According to the 3rd embodiment, the focus tunable component 380 is a liquid lens set and the detailed optical data and parameters thereof are disclosed in Tables 3A, 3C and 3D below.

The detailed optical data of the 3rd embodiment are shown in Table 3A and the aspheric surface data are shown in Table 3B below.

TABLE 3A

3rd Embodiment

| Surface # | | Curvature Radius | Thickness | Material | Index | Abbe # | Focal Length | (dn/dt) × 10 (1/° C) |
|---|---|---|---|---|---|---|---|---|
| 0 | Object | Plano | 450.000 | | | | | |
| 1 | Ape. Stop | Plano | 0.015 | | | | | |
| 2 | DOE | Plano | 0.150 | $SiO_2$ | 1.451 | 67.8 | — | — |
| 3 | | Plano | 0.015 | | | | | |
| 4 | Cover glass | Plano | 0.150 | Glass | 1.508 | 64.2 | — | — |
| 5 | | Plano | 0.050 | | | | | |
| 6 | Focus Tunable Component | Plano | 0.400 | Polymer | 1.525 | 55.9 | ft | — |
| 7 | | Rt | 0.050 | | | | | |
| 8 | Lens 1 | 1.179 | 0.580 | Glass | 1.669 | 31.1 | 2.67 | — |
| 9 | | 2.780 | 0.108 | | | | | |
| 10 | Lens 2 | 0.974 ASP | 0.551 | Plastic | 1.618 | 22.5 | −6.91 | −118.0 |
| 11 | | 0.621 ASP | 0.591 | | | | | |
| 12 | Lens 3 | −0.681 ASP | 0.241 | Plastic | 1.641 | 19.5 | 24.28 | −115.0 |
| 13 | | −0.743 ASP | 0.161 | | | | | |
| 14 | Lens 4 | −1.179 ASP | 0.580 | Plastic | 1.535 | 56.0 | 3.03 | −106.1 |
| 15 | | −0.800 ASP | 0.190 | | | | | |
| 16 | Light Source | Plano | — | | | | | |

Reference wavelength is 940.0 nm

TABLE 3B

Aspheric Coefficients

| | Surface # | | |
|---|---|---|---|
| | 10 | 11 | 12 |
| k = | −7.1997E−01 | −1.2333E+00 | −1.5100E+00 |
| A4 = | 4.7212E−02 | 7.4741E−01 | −5.7898E−01 |
| A6 = | −3.4382E−02 | 4.8696E−01 | 4.2559E+00 |
| A8 = | −1.1875E−02 | 2.6394E+00 | 1.0390E+01 |
| A10 = | −2.1859E−01 | −1.0899E+01 | −1.7934E+02 |

| | Surface # | | |
|---|---|---|---|
| | 13 | 14 | 15 |
| k = | −8.2492E−01 | 1.8381E+00 | −3.7006E−01 |
| A4 = | 9.7433E−01 | 1.1363E+00 | −2.5393E−02 |
| A6 = | 4.4853E+00 | 2.2262E+00 | −1.2615E−02 |
| A8 = | 1.4216E+01 | −4.0842E+00 | 1.0175E+00 |
| A10 = | −7.7275E+01 | 2.8280E+00 | −4.0036E+00 |
| A12 = | | | 8.8660E+00 |

In the 3rd embodiment, the equation of the aspheric surface profiles of the aforementioned lens elements is the same as the equation of the 1st embodiment. Also, the definitions of these parameters shown in the following Table 3C and Table 3D are the same as those stated in the 1st embodiment with corresponding values for the 3rd embodiment, so an explanation in this regard will not be provided again.

Moreover, in the 3rd embodiment, the values of the parameters under Mode 1 and Mode 2 are shown in Tables 3C and 3D below.

TABLE 3C

3rd Embodiment

| | Mode 1 (20° C.) | Mode 2 (50° C.) |
|---|---|---|
| f | 3.18 | 3.18 |
| Fno | 2.67 | 2.67 |
| HFOV (deg.) | 9.8 | 9.8 |

TABLE 3C-continued

3rd Embodiment

| | Mode 1 (20° C.) | Mode 2 (50° C.) |
|---|---|---|
| ft | Infinity | −1713.85 |
| Rt | Infinity | 900.000 |

TABLE 3D

3rd Embodiment

| | Mode 1 | Mode 2 | | Mode 1 | Mode 2 |
|---|---|---|---|---|---|
| tan(HFOV) | 0.17 | 0.17 | BL/f | 0.060 | 0.060 |
| λ [nm] | 940.0 | | TL/DS | 2.90 | 2.90 |
| Dtm/CTt | 0.13 | | SDr/SDm | 0.84 | 0.84 |
| (Rr + Rm)/(Rr − Rm) | −0.19 | | SDmax [mm] | 0.74 | 0.74 |
| ΣCTa [mm] | 1.95 | | Yp1/f | 0.08 | 0.08 |
| f/Rm | 2.70 | 2.70 | Yp2/f | 0.18 | 0.18 |
| |Δ(f/ft)| | 0.002 | | DL [mm] | 1.10 | 1.10 |
| |fa/ft| | 0.000 | 0.002 | Nmax | 1.669 | |
| |ft50/(100×f)| | Infinity | 5.389 | |DIST| | 0.28% | 0.28% |
| 10×f/OBJ | 0.071 | 0.071 | N | 4 | |

4th Embodiment

Figure 7:
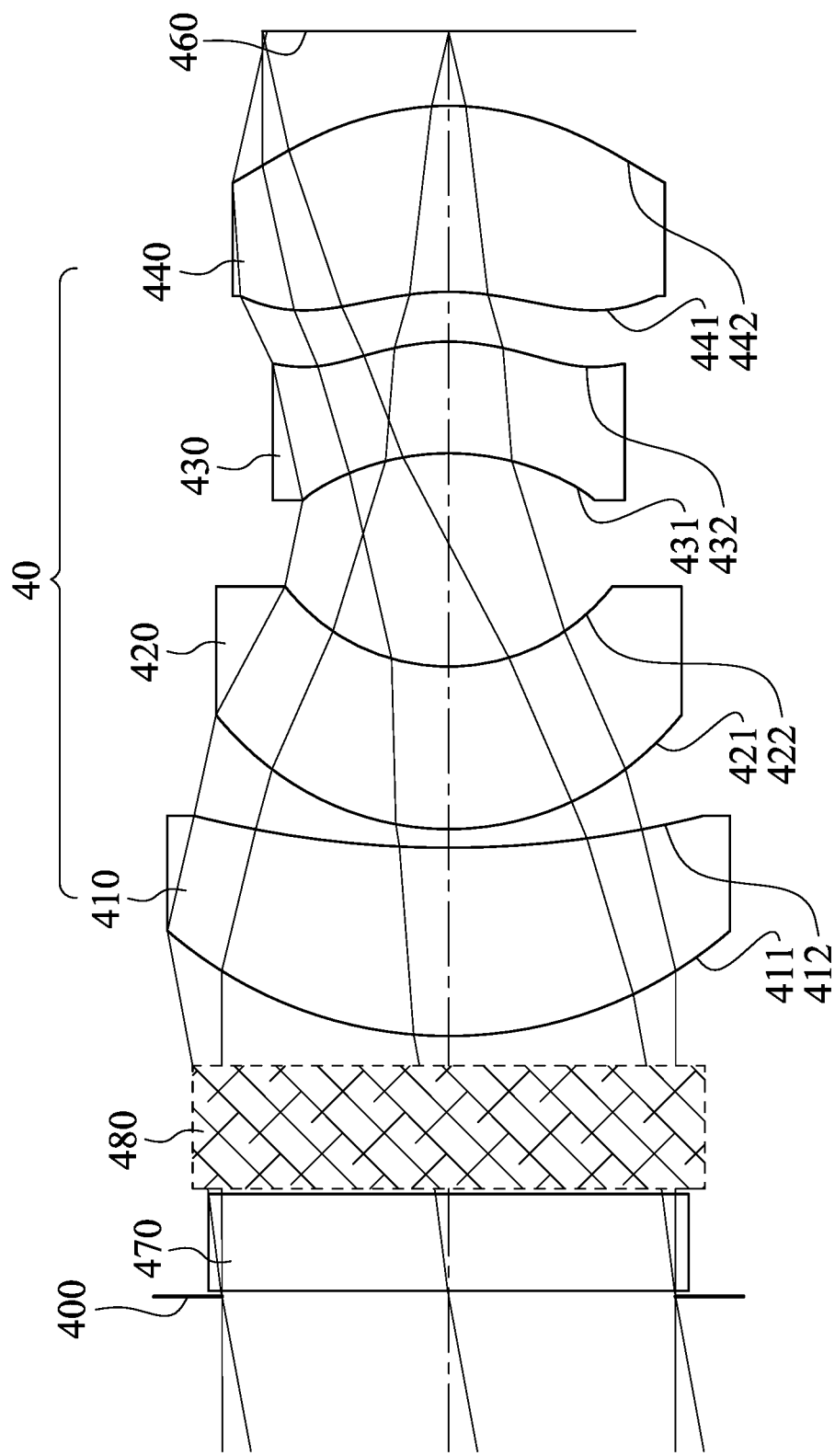
FIG. 7 is a schematic view of a projection apparatus according to the 4th embodiment of the present disclosure.
Figure 8A:
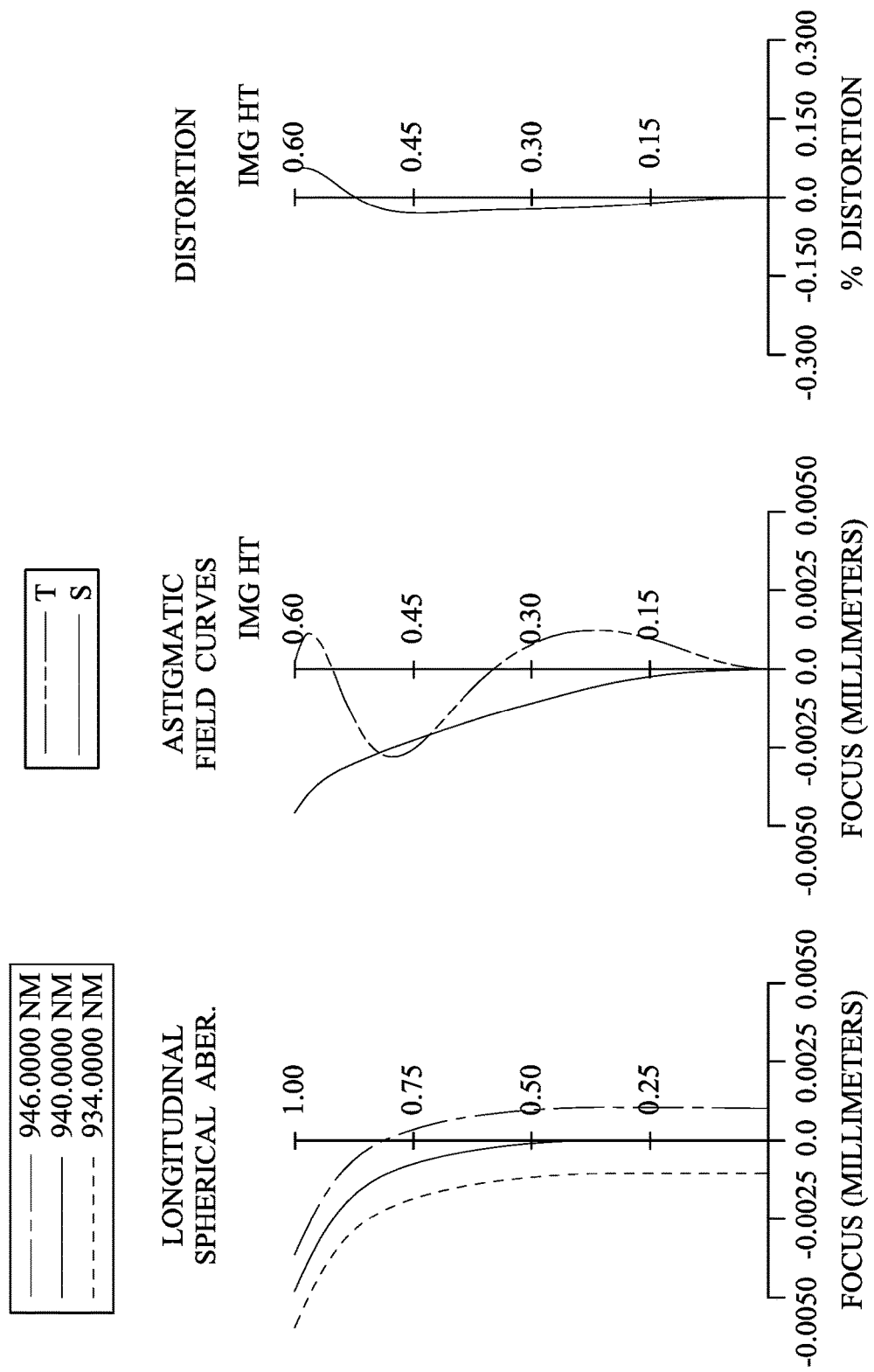
FIG. 8A shows spherical aberration curves, astigmatic field curves and a distortion curve of Mode 1 of the projection apparatus according to the 4th embodiment.
Figure 8B:
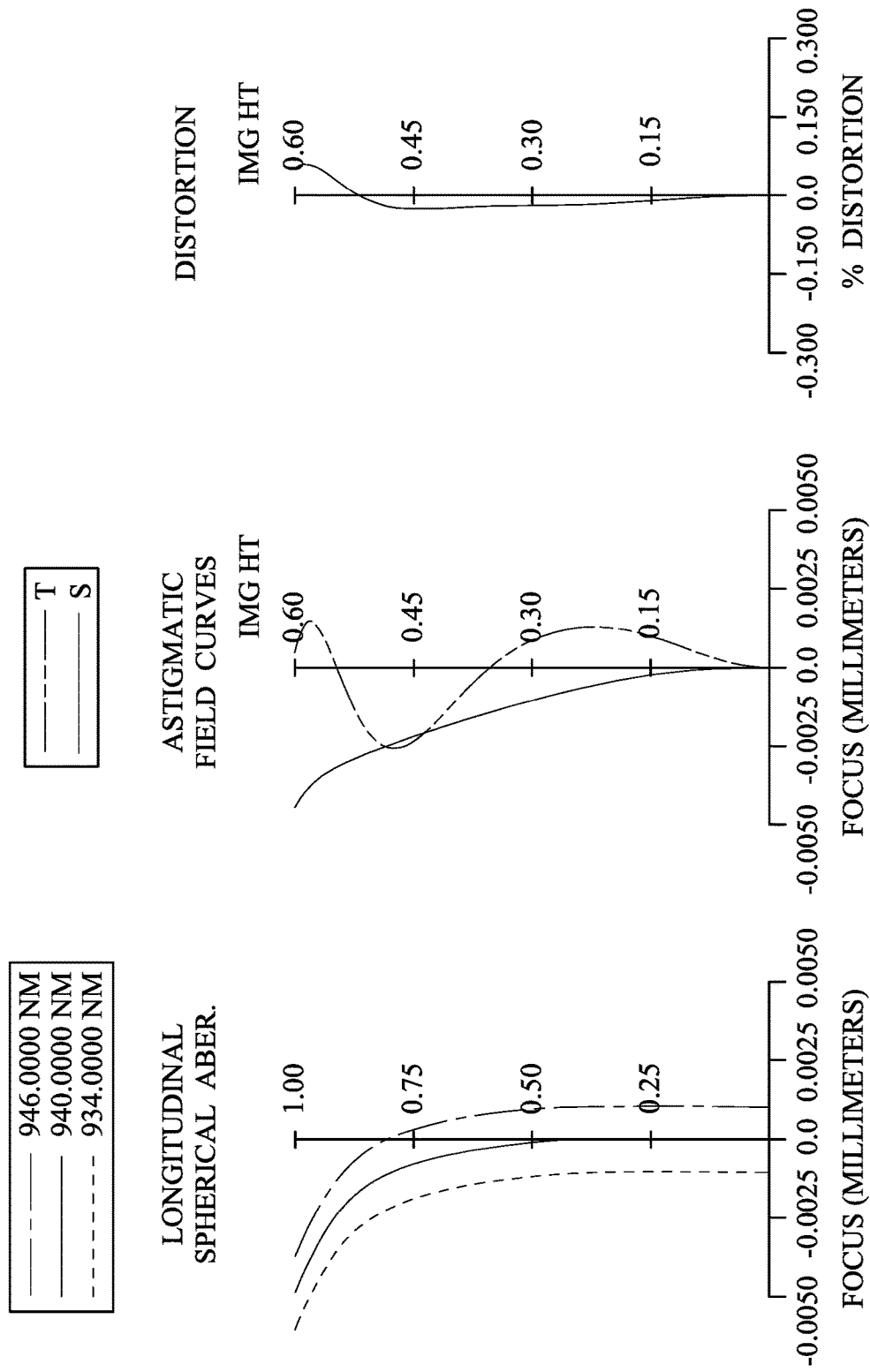
FIG. 8B shows spherical aberration curves, astigmatic field curves and a distortion curve of Mode 2 of the projection apparatus according to the 4th embodiment.

FIG. 7 is a schematic view of a projection apparatus according to the 4th embodiment of the present disclosure. FIG. 8A shows spherical aberration curves, astigmatic field curves and a distortion curve of Mode 1 of the projection apparatus according to the 4th embodiment, and FIG. 8B shows spherical aberration curves, astigmatic field curves and a distortion curve of Mode 2 of the projection apparatus according to the 4th embodiment, wherein Mode 1 and Mode 2 are two modes of the projection apparatus under the focusing conditions at temperatures of 20° C. and 50° C., respectively, and the corresponding parameter variations are shown in Table 4C below. In FIG. 7, the projection apparatus according to the 4th embodiment includes a projection lens system (its reference numeral is omitted) and a light source (its reference numeral is omitted), wherein the projection lens system has a magnification side and a reduction side, the light source is disposed on a conjugation surface 460 on the reduction side of the projection lens system, and the projection lens system projects light from the conjugation surface 460 on the reduction side onto a conjugation surface on the magnification side. In the 4th embodiment, the light source can be a vertical-cavity surface-emitting laser. The projection lens system includes, in order from the magnification side to the reduction side, an aperture stop 400, a diffractive optical element 470, a focus tunable component 480 and a lens assembly 40, wherein the lens assembly 40 includes a first lens element 410, a second lens element 420, a third lens element 430 and a fourth lens element 440, and the diffractive optical element 470 and the focus tunable component 480 are disposed on a magnification side of the lens assembly 40. In detail, the first lens element 410, the second lens element 420, the third lens element 430 and the fourth lens element 440 in the lens assembly 40 can be divided into three lens groups, that is, the lens assembly 40 can include three lens groups, which are, in order from the magnification side to the reduction side, a first lens group having positive refractive power, a second lens group having negative refractive power and a third lens group having positive refractive power, wherein the first lens group can include the first lens element 410, the second lens group can include the second lens element 420, the third lens group can include the third lens element 430 and the fourth lens element 440.

The first lens element 410 with positive refractive power has a magnification-side surface 411 being convex and a reduction-side surface 412 being concave. The first lens element 410 is made of a glass material, and has the magnification-side surface 411 and the reduction-side surface 412 being both spherical.

The second lens element 420 with negative refractive power has a magnification-side surface 421 being convex and a reduction-side surface 422 being concave. The second lens element 420 is made of a plastic material, and has the magnification-side surface 421 and the reduction-side surface 422 being both aspheric.

The third lens element 430 with positive refractive power has a magnification-side surface 431 being concave and a reduction-side surface 432 being convex. The third lens element 430 is made of a plastic material, and has the magnification-side surface 431 and the reduction-side surface 432 being both aspheric.

The fourth lens element 440 with positive refractive power has a magnification-side surface 441 being concave and a reduction-side surface 442 being convex. The fourth lens element 440 is made of a plastic material, and has the magnification-side surface 441 and the reduction-side surface 442 being both aspheric. Furthermore, each of the magnification-side surface 441 and the reduction-side surface 442 of the fourth lens element 440 includes at least one inflection point.

The diffractive optical element 470 is disposed between the aperture stop 400 and the focus tunable component 480, and is made of $SiO_2$.

According to the 4th embodiment, the focus tunable component 480 is a liquid lens set and the detailed optical data and parameters thereof are disclosed in Tables 4A, 4C and 4D below.

The detailed optical data of the 4th embodiment are shown in Table 4A and the aspheric surface data are shown in Table 4B below.

TABLE 4A

4th Embodiment

| Surface # | | Curvature Radius | Thickness | Material | Index | Abbe # | Focal Length | $(dn/dt) \times 10^{-8}$ (1/ °C.) |
|---|---|---|---|---|---|---|---|---|
| 0 | Object | Plano | 720.000 | | | | | |
| 1 | Ape. Stop | Plano | 0.018 | | | | | |
| 2 | DOE | Plano | 0.312 | $SiO_2$ | 1.451 | 67.8 | — | — |
| 3 | | Plano | 0.018 | | | | | |
| 4 | Focus Tunable Component | Plano | 0.396 | Polymer | 1.508 | 64.2 | ft | — |
| 5 | | Rt | 0.096 | | | | | |
| 6 | Lens 1 | 1.380 | 0.607 | Glass | 1.669 | 31.1 | 3.14 | — |
| 7 | | 3.314 | 0.060 | | | | | |
| 8 | Lens 2 | 0.931 ASP | 0.524 | Plastic | 1.618 | 22.5 | −24.25 | −118.0 |
| 9 | | 0.688 ASP | 0.688 | | | | | |
| 10 | Lens 3 | −0.848 ASP | 0.360 | Plastic | 1.618 | 22.5 | 3.85 | −118.0 |
| 11 | | −0.726 ASP | 0.161 | | | | | |
| 12 | Lens 4 | −0.899 ASP | 0.600 | Plastic | 1.618 | 22.5 | 6.32 | −118.0 |
| 13 | | −0.917 ASP | 0.241 | | | | | |
| 14 | Light Source | Plano | — | | | | | |

Reference wavelength is 940.0 nm

TABLE 4B

Aspheric Coefficients

| | Surface # | | |
|---|---|---|---|
| | 8 | 9 | 10 |
| k = | −6.6711E−02 | −1.7888E−01 | 1.2865E−00 |
| A4 = | 5.4775E−03 | 1.9525E−01 | −1.3965E−01 |
| A6 = | 7.0765E−04 | 3.6445E−01 | 5.3128E+00 |
| A8 = | −3.2892E−02 | −1.7470E−02 | −1.3691E+01 |
| A10 = | −2.9521E−02 | | |

| | Surface # | | |
|---|---|---|---|
| | 11 | 12 | 13 |
| k = | −7.0351E−01 | −4.8663E+00 | −2.5812E−01 |
| A4 = | 9.5580E−01 | 6.1009E−01 | 1.5708E−01 |
| A6 = | 2.9201E+00 | 1.7571E+00 | −6.7566E−02 |

TABLE 4B-continued

Aspheric Coefficients

| A8 =  | 3.3662E+00  | −3.6877E+00 | −7.1546E−03 |
| A10 = | −2.0500E+01 | 1.8328E+00  | 8.9221E−01  |

In the 4th embodiment, the equation of the aspheric surface profiles of the aforementioned lens elements is the same as the equation of the 1st embodiment. Also, the definitions of these parameters shown in the following Table 4C and Table 4D are the same as those stated in the 1st embodiment with corresponding values for the 3rd embodiment, so an explanation in this regard will not be provided again.

Moreover, in the 4th embodiment, the values of the parameters under Mode 1 and Mode 2 are shown in Tables 4C and 4D below.

TABLE 4C

4th Embodiment

|            | Mode 1 (20° C.) | Mode 2 (50° C.) |
|------------|-----------------|-----------------|
| f          | 3.24            | 3.24            |
| Fno        | 2.22            | 2.22            |
| HFOV (deg.)| 10.5            | 10.5            |
| ft         | Infinity        | −3540.70        |
| Rt         | Infinity        | 1800.000        |

TABLE 4D

4th Embodiment

|              | Mode 1   | Mode 2 |           | Mode 1 | Mode 2 |
|--------------|----------|--------|-----------|--------|--------|
| tan(HFOV)    | 0.19     | 0.19   | BL/f      | 0.074  | 0.074  |
| λ [nm]       | 940.0    |        | TL/DS     | 2.55   | 2.55   |
| Dtm/CTt      | 0.24     |        | SDr/SDm   | 0.77   | 0.77   |
| (Rr + Rm)/(Rr − Rm) | −0.20 |     | SDmax [mm]| 0.91   | 0.91   |
| ΣCTa [mm]    | 2.09     |        | Yp1/f     | 0.08   | 0.08   |
| f/Rm         | 2.35     | 2.35   | Yp2/f     | 0.19   | 0.19   |
| |Δ(f/ft)|    | 0.001    |        | DL [mm]   | 1.20   | 1.20   |
| |fa/ft|      | 0.000    | 0.001  | Nmax      | 1.669  |        |
| |ft50/(100×f)| | Infinity | 10.925 | |DIST|   | 0.05%  | 0.05%  |
| 10×f/OBJ     | 0.045    | 0.045  | N         | 4      |        |

5th Embodiment

Figure 9:
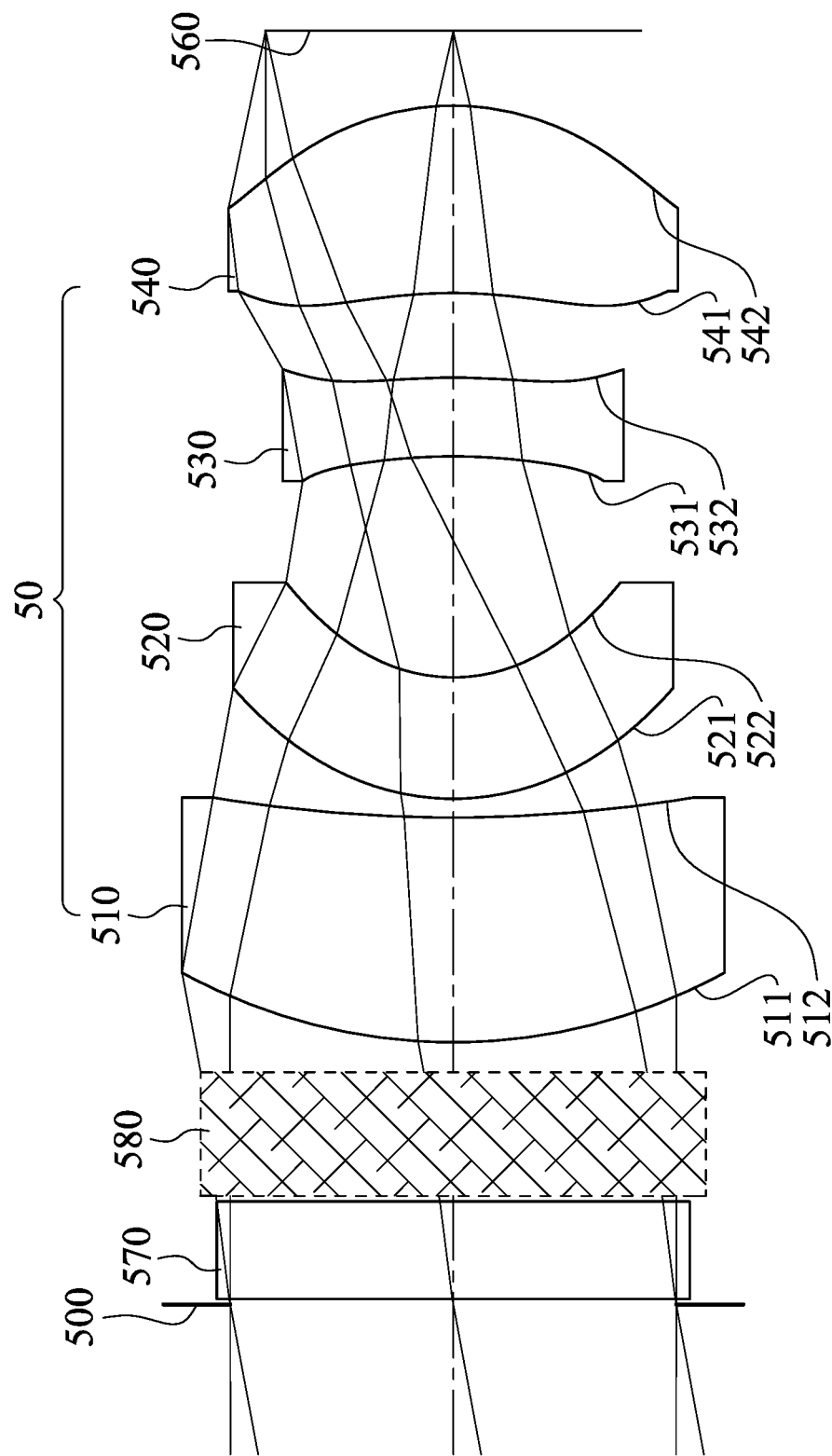
FIG. 9 is a schematic view of a projection apparatus according to the 5th embodiment of the present disclosure.
Figure 10A:
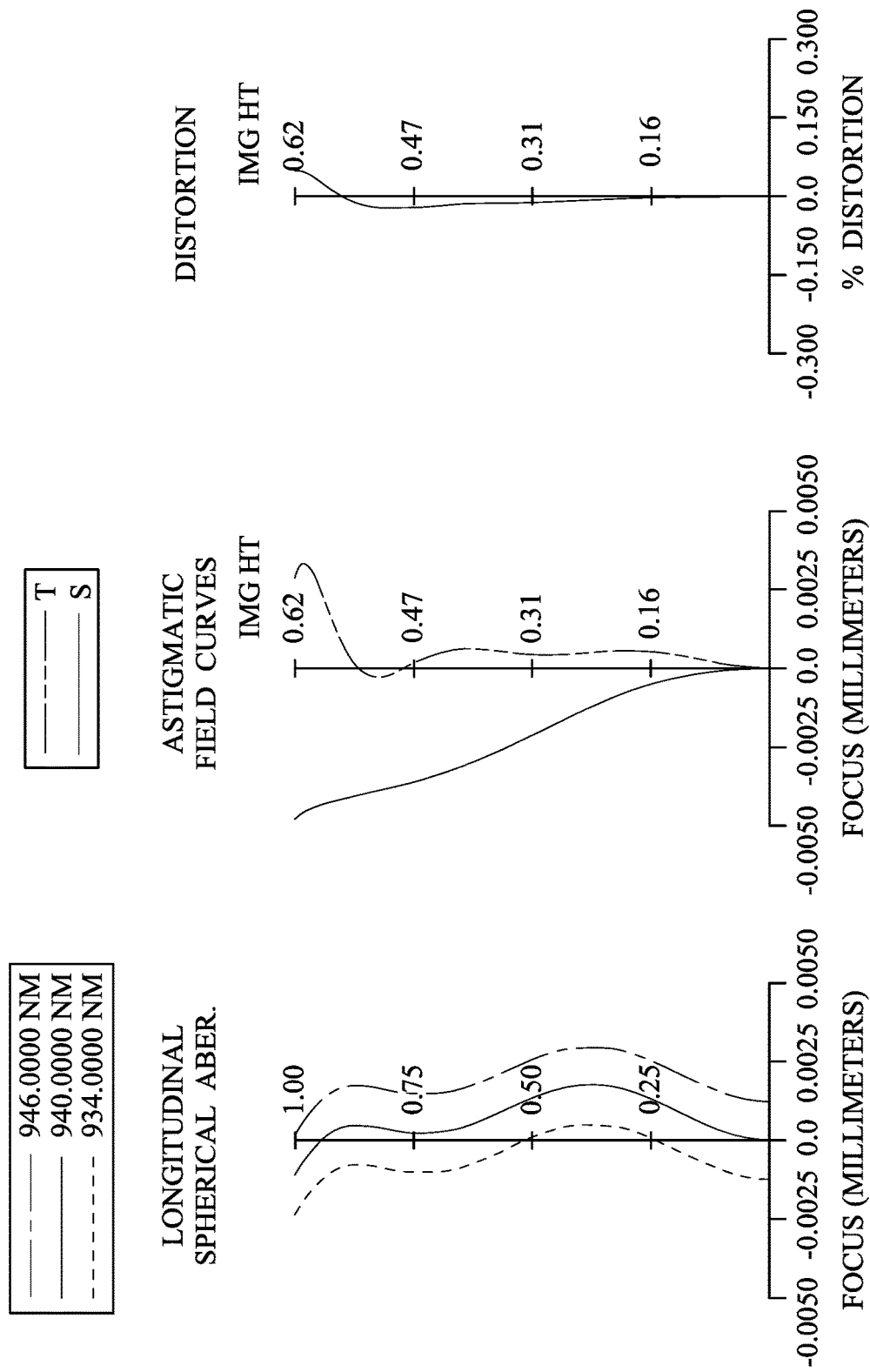
FIG. 10A shows spherical aberration curves, astigmatic field curves and a distortion curve of Mode 1 of the projection apparatus according to the 5th embodiment.
Figure 10B:
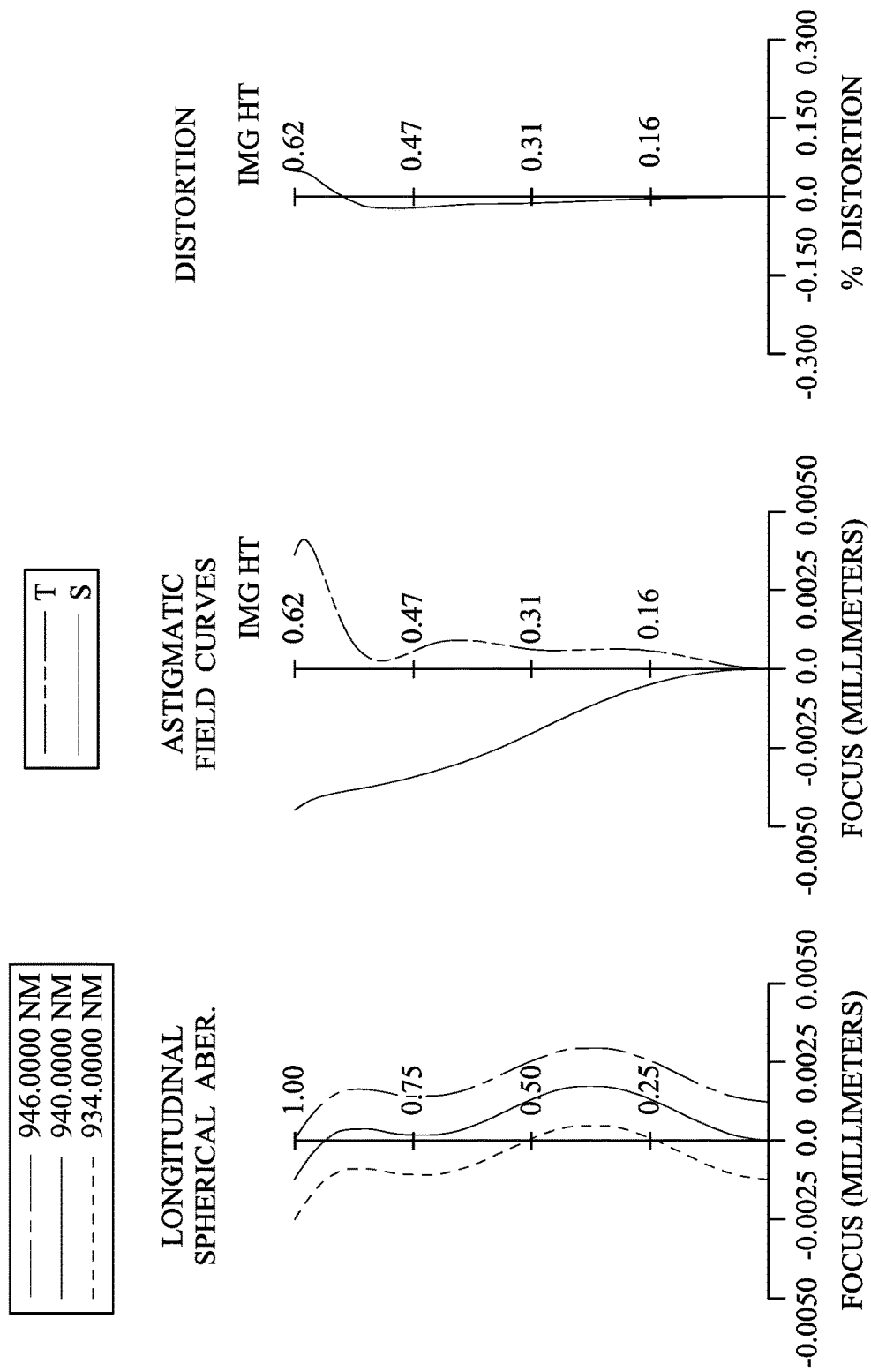
FIG. 10B shows spherical aberration curves, astigmatic field curves and a distortion curve of Mode 2 of the projection apparatus according to the 5th embodiment.

FIG. 9 is a schematic view of a projection apparatus according to the 5th embodiment of the present disclosure. FIG. 10A shows spherical aberration curves, astigmatic field curves and a distortion curve of Mode 1 of the projection apparatus according to the 5th embodiment, and FIG. 10B shows spherical aberration curves, astigmatic field curves and a distortion curve of Mode 2 of the projection apparatus according to the 5th embodiment, wherein Mode 1 and Mode 2 are two modes of the projection apparatus under the focusing conditions at temperatures of 20° C. and 50° C., respectively, and the corresponding parameter variations are shown in Table 5C below. In FIG. 9, the projection apparatus according to the 5th embodiment includes a projection lens system (its reference numeral is omitted) and a light source (its reference numeral is omitted), wherein the projection lens system has a magnification side and a reduction side, the light source is disposed on a conjugation surface 560 on the reduction side of the projection lens system, and the projection lens system projects light from the conjugation surface 560 on the reduction side onto a conjugation surface on the magnification side. In the 5th embodiment, the light source can be a vertical-cavity surface-emitting laser. The projection lens system includes, in order from the magnification side to the reduction side, an aperture stop 500, a diffractive optical element 570, a focus tunable component 580 and a lens assembly 50, wherein the lens assembly 50 includes a first lens element 510, a second lens element 520, a third lens element 530 and a fourth lens element 540, and the diffractive optical element 570 and the focus tunable component 580 are disposed on a magnification side of the lens assembly 50. In detail, the first lens element 510, the second lens element 520, the third lens element 530 and the fourth lens element 540 in the lens assembly 50 can be divided into three lens groups, that is, the lens assembly 50 can include three lens groups, which are, in order from the magnification side to the reduction side, a first lens group having positive refractive power, a second lens group having negative refractive power and a third lens group having positive refractive power, wherein the first lens group can include the first lens element 510, or can include the first lens element 510 and the second lens element 520, the second lens group can include the second lens element 520 and the thirds lens element 530, or can include the third lens element 530, or can include the second lens element 520, the third lens group can include the fourth lens element 540, or can include the third lens element 530 and the fourth lens element 540.

The first lens element 510 with positive refractive power has a magnification-side surface 511 being convex and a reduction-side surface 512 being concave. The first lens element 510 is made of a glass material, and has the magnification-side surface 511 and the reduction-side surface 512 being both spherical.

The second lens element 520 with negative refractive power has a magnification-side surface 521 being convex and a reduction-side surface 522 being concave. The second lens element 520 is made of a plastic material, and has the magnification-side surface 521 and the reduction-side surface 522 being both aspheric.

The third lens element 530 with negative refractive power has a magnification-side surface 531 being concave and a reduction-side surface 532 being convex. The third lens element 530 is made of a plastic material, and has the magnification-side surface 531 and the reduction-side surface 532 being both aspheric.

The fourth lens element 540 with positive refractive power has a magnification-side surface 541 being concave and a reduction-side surface 542 being convex. The fourth lens element 540 is made of a plastic material, and has the magnification-side surface 541 and the reduction-side surface 542 being both aspheric. Furthermore, each of the magnification-side surface 541 and the reduction-side surface 542 of the fourth lens element 540 includes at least one inflection point.

The diffractive optical element 570 is disposed between the aperture stop 500 and the focus tunable component 580, and is made of $SiO_2$.

According to the 5th embodiment, the focus tunable component 580 is a liquid lens set and the detailed optical data and parameters thereof are disclosed in Tables 5A, 5C and 5D below.

The detailed optical data of the 5th embodiment are shown in Table 5A and the aspheric surface data are shown in Table 5B below.

TABLE 5A

5th Embodiment

| Surface # | | Curvature Radius | Thickness | Material | Index | Abbe # | Focal Length | $(dn/dt) \times 10^{-6}$ (1/° C.) |
|---|---|---|---|---|---|---|---|---|
| 0 | Object | Plano | 750.000 | | | | | |
| 1 | Ape. Stop | Plano | 0.019 | | | | | |
| 2 | DOE | Plano | 0.325 | $SiO_2$ | 1.451 | 67.8 | — | — |
| 3 | | Plano | 0.019 | | | | | |
| 4 | Focus Tunable Component | Plano | 0.413 | Polymer | 1.508 | 64.2 | ft | — |
| 5 | | Rt | 0.100 | | | | | |
| 6 | Lens 1 | 1.875 | 0.750 | Glass | 1.966 | 25.5 | 2.81 | — |
| 7 | | 4.849 | 0.063 | | | | | |
| 8 | Lens 2 | 0.836 ASP | 0.405 | Plastic | 1.634 | 20.4 | −6.61 | −117.0 |
| 9 | | 0.566 ASP | 0.738 | | | | | |
| 10 | Lens 3 | −1.932 ASP | 0.263 | Plastic | 1.634 | 20.4 | −27.43 | −117.0 |
| 11 | | −2.288 ASP | 0.283 | | | | | |
| 12 | Lens 4 | −1.659 ASP | 0.625 | Plastic | 1.535 | 56.0 | 2.71 | −106.1 |
| 13 | | −0.876 ASP | 0.250 | | | | | |
| 14 | Light Source | Plano | — | | | | | |

Reference wavelength is 940.0 nm

TABLE 5B

Aspheric Coefficients

| | Surface # | | |
|---|---|---|---|
| | 8 | 9 | 10 |
| k = | −8.0657E−01 | −1.0344E+00 | 2.3492E+00 |
| A4 = | 9.7927E−02 | 4.6246E−01 | 2.3136E−01 |
| A6 = | 1.1778E−01 | 4.7638E−01 | −9.2273E−01 |
| A8 = | −2.2499E−01 | −7.8147E−01 | 5.9600E+00 |
| A10 = | 1.5963E−01 | −2.6611E+00 | −3.6641E+01 |

| | Surface # | | |
|---|---|---|---|
| | 11 | 12 | 13 |
| k = | 6.0667E+00 | 8.7916E−01 | 5.5992E−04 |
| A4 = | 9.2604E−01 | 4.8035E−01 | 5.3849E−02 |
| A6 = | −4.0008E−01 | −3.7909E−01 | 6.2744E−02 |
| A8 = | 1.3094E+01 | 5.5325E+00 | 1.1271E−01 |
| A10 = | −4.5088E+01 | −1.1663E+01 | 1.5834E−02 |
| A12 = | 3.5790E+01 | 7.3283E+00 | 1.2636E+00 |

In the 5th embodiment, the equation of the aspheric surface profiles of the aforementioned lens elements is the same as the equation of the 1st embodiment. Also, the definitions of these parameters shown in the following Table 5C and Table 5D are the same as those stated in the 1st embodiment with corresponding values for the 5th embodiment, so an explanation in this regard will not be provided again.

Moreover, in the 5th embodiment, the values of the parameters under Mode 1 and Mode 2 are shown in Tables 5C and 5D below.

TABLE 5C

5th Embodiment

| | Mode 1 (20° C.) | Mode 2 (50° C.) |
|---|---|---|
| f | 3.37 | 3.37 |
| Fno | 2.27 | 2.27 |
| HFOV(deg.) | 10.5 | 10.5 |
| ft | Infinity | −1770.35 |
| Rt | Infinity | 900.000 |

TABLE 5D

5th Embodiment

| | Mode 1 | Mode 2 | | Mode 1 | Mode 2 |
|---|---|---|---|---|---|
| tan(HFOV) | 0.19 | 0.19 | BL/f | 0.074 | 0.074 |
| λ [nm] | 940.0 | | TL/DS | 2.84 | 2.84 |
| Dtm/CTt | 0.24 | | SDr/SDm | 0.83 | 0.83 |
| (Rr + Rm)/(Rr − Rm) | −0.36 | | SDmax [mm] | 0.90 | 0.90 |
| ΣCTa [mm] | 2.04 | | Yp1/f | 0.09 | 0.09 |
| f/Rm | 1.80 | 1.80 | Yp2/f | 0.20 | 0.20 |
| |Δ(f/ft)| | 0.002 | | DL [mm] | 1.25 | 1.25 |
| |fa/ft| | 0.000 | 0.002 | Nmax | 1.966 | |
| |ft50/(100×f)| | Infinity | 5.249 | |DIST| | 0.05% | 0.05% |
| 10×f/OBJ | 0.047 | 0.047 | N | 4 | |

6th Embodiment

Figure 13:
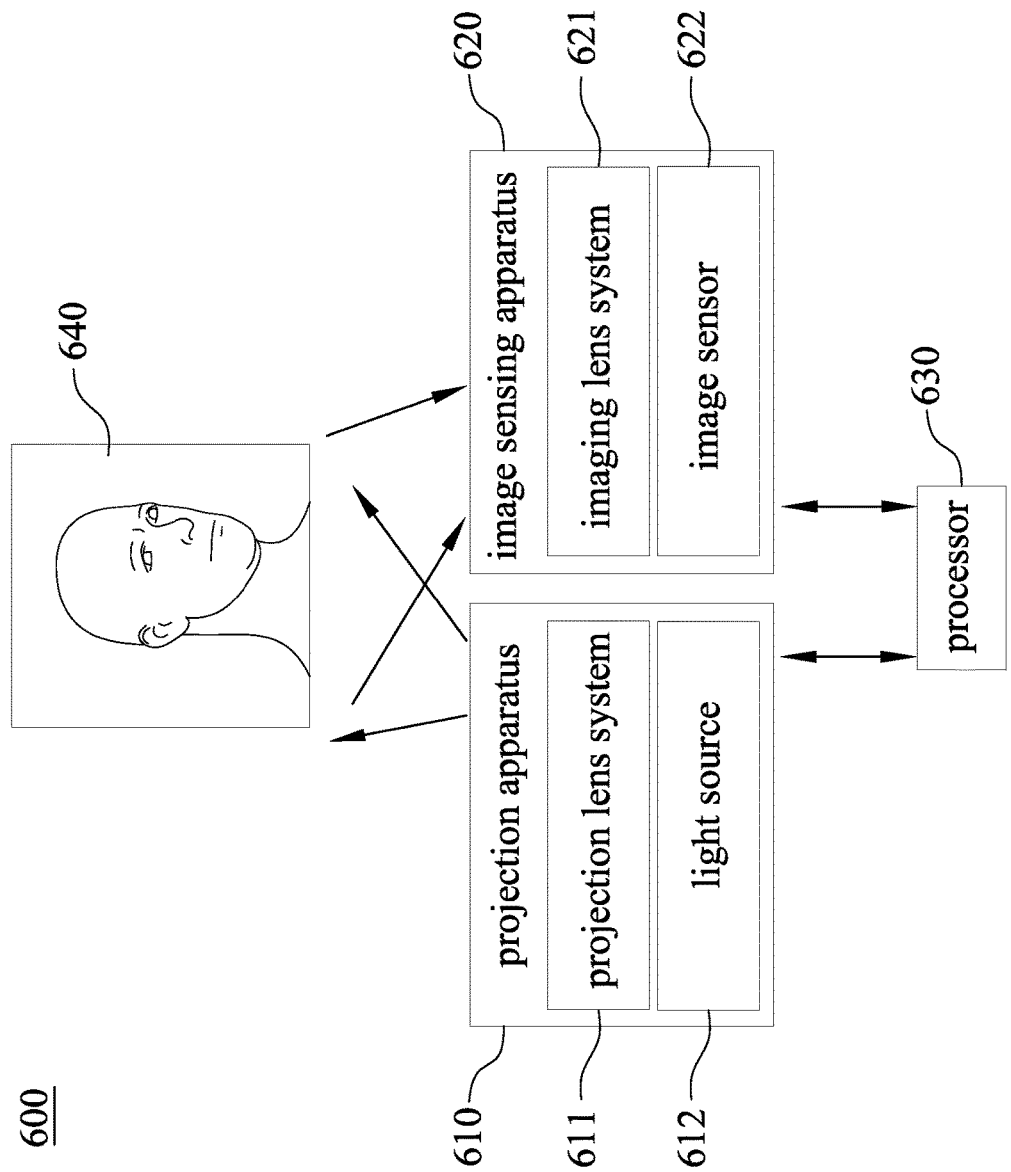
FIG. 13 is a schematic view of a sensing module according to the 6th embodiment of the present disclosure.

FIG. 13 is a schematic view of a sensing module 600 according to the 6th embodiment of the present disclosure. In FIG. 13, the sensing module 600 includes a projection apparatus 610 and an image sensing apparatus 620. The projection apparatus 610 includes the projection lens system 611 and a light source 612, wherein the projection lens system 611 can be any one of the foregoing 1st embodiment to the 5th embodiment, but not be limited thereof. The image sensing apparatus 620 includes an imaging lens system 621 and an image sensor 622, wherein the image sensor 622 is disposed on an image surface of the imaging lens system 621. Both of the projection apparatus 610 and the image sensing apparatus 620 are connected to a processor 630, and the imaging lens system 621 is for receiving information on the conjugation surface on the magnification side of the projection lens system 611, and for imaging the information on the image sensor 622.

In detail, the projection lens system 611 can include the diffractive optical element, the focus tunable component and the lens assembly according to any one of the foregoing 1st embodiment to the 5th embodiment. The light source 612 can be composed by a laser array, and can be vertical-cavity surface-emitting laser, which is disposed on a conjugation surface on the reduction side of the projection lens system 611. The light source 612 can be formed into a structured light through the projection lens system 611, and projected on a sensed object 640. The imaging lens system 621 can receive the reflective light from the sensed object 640, and the received information can be calculated by the processor 630 so as to obtain the relative distance of each portion of the sensed object 640, further obtain the 3D-shaped variation on the surface of the sensed object 640 and image it on the image sensor 622.

7th Embodiment

Figure 14:
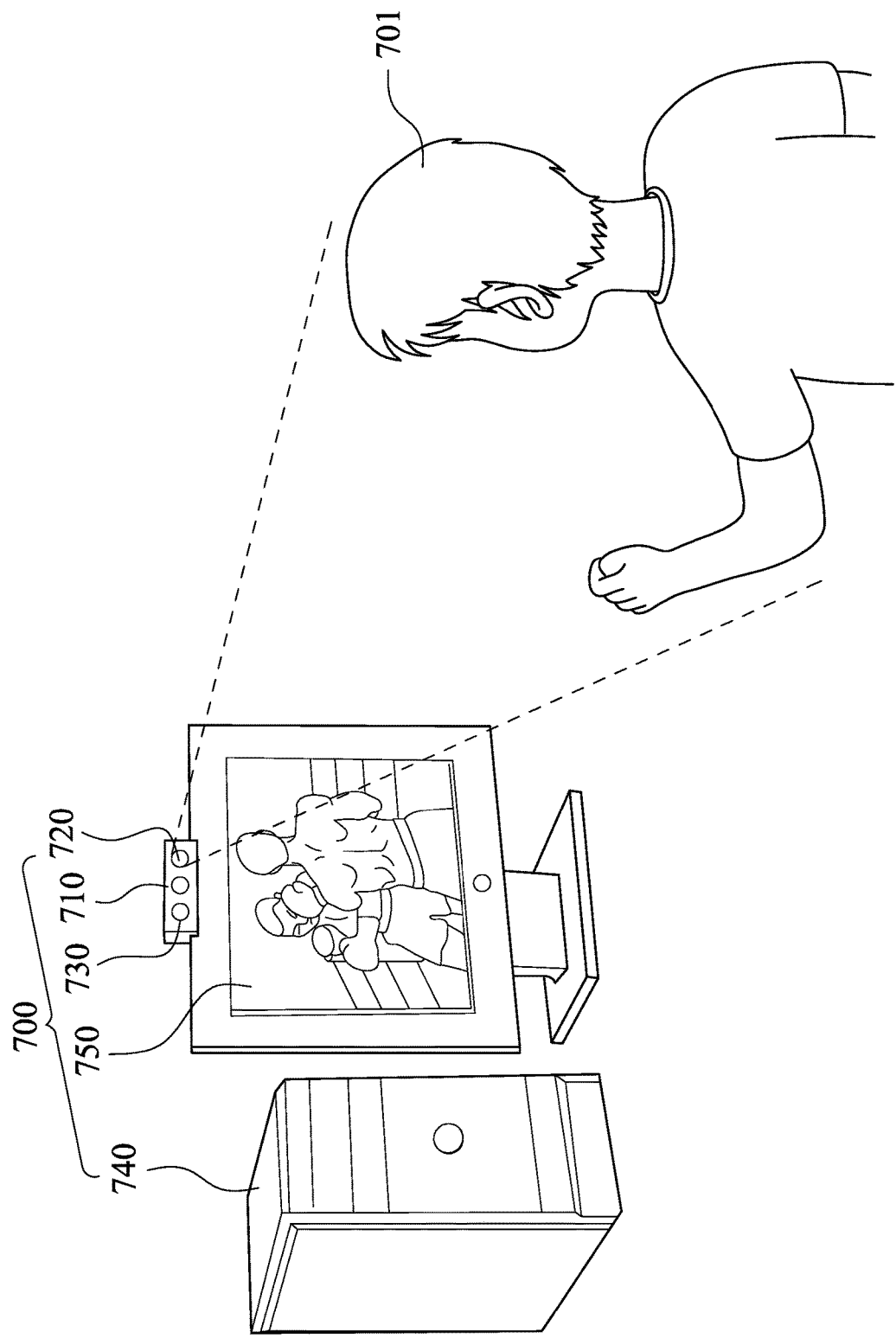
FIG. 14 is a schematic view of an electronic device according to the 7th embodiment of the present disclosure.

FIG. 14 is a schematic view of an electronic device 700 according to the 7th embodiment of the present disclosure. In FIG. 14, the electronic device 700 includes a sensing module 710, a processor 740 and a display apparatus 750, wherein the sensing module 710 includes a projection apparatus 720 and an image sensing apparatus 730, and the sensing module 710 according to the 7th embodiment is the same with the sensing module 600 according to the 6th embodiment, and will not describe again herein.

The dynamic variation of a sensed object 701 can be displayed on the display apparatus 750 by the cooperation of the projection apparatus 720 and the image sensing apparatus 730 of the sensing module 710 with the processor 740.

8th Embodiment

Figure 15:
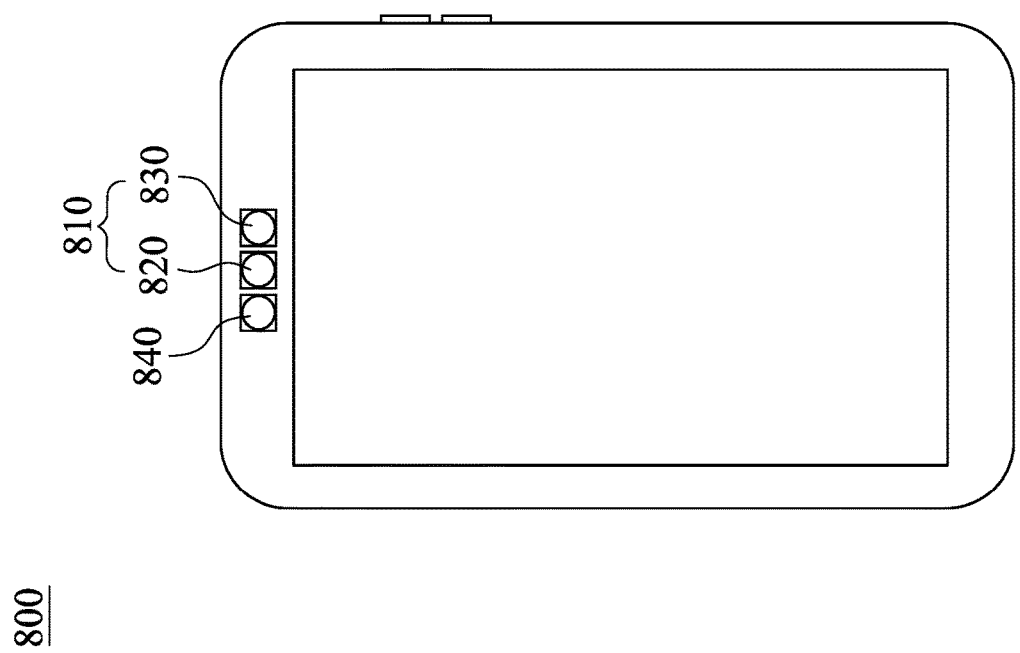
FIG. 15 is a schematic view of an electronic device according to the 8th embodiment of the present disclosure.

FIG. 15 is a schematic view of an electronic device 800 according to the 8th embodiment of the present disclosure. In FIG. 15, the electronic device 800 includes a sensing module 810 and a photographing lens assembly 840, wherein the sensing module 810 includes a projection apparatus 820 and an image sensing apparatus 830, wherein the projection apparatus 820 can include a projection lens system and at least one light source, and the image sensing apparatus 830 can include an imaging lens system and an image sensor. The light source can be composed by a laser array, which can be formed into a structured light through the projection lens system, and projected on a sensed object. The imaging lens system can receive the reflective light from the sensed object, and the received information can be calculated by the processor so as to obtain the relative distance of each portion of the sensed object, and further obtain the 3D-shaped variation on the surface of the sensed object. The photographing lens assembly 840 can capture the surrounding image, and combine it with the sensed information of the sensing module 810, so as to apply to the electronic device with Augmented Reality, but not be limited thereto.

In the 8th embodiment, the detailed arrangement of the projection apparatus 820 and the image sensing apparatus 830 of the sensing module 810 can refer to FIG. 13 and the description in the 6th embodiment, and will not describe again herein.

The foregoing description, for purpose of explanation, has been described with reference to specific embodiments. It is to be noted that Tables 1A-5D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A projection lens system, having a magnification side and a reduction side, which projects a light from a conjugation surface on the reduction side onto a conjugation surface on the magnification side, the projection lens system comprising:
a focus tunable component; and
a lens assembly, comprising a plurality of lens elements, and at least one surface of at least one of the lens elements comprising at least one inflection point;
wherein a focal length of the projection lens system is f, a focal length of the focus tunable component is ft, and the following condition is satisfied:

$$0<|\Delta(f/\text{ft})|<0.15.$$

2. The projection lens system of claim 1, wherein the focus tunable component is disposed on a magnification side of the lens assembly.

3. The projection lens system of claim 1, wherein the focal length of the projection lens system is f, the focal length of the focus tunable component is ft, and the following condition is satisfied:

$$0<|\Delta(f/\text{ft})|<0.05.$$

4. The projection lens system of claim 1, wherein a focal length of the lens assembly is fa, the focal length of the focus tunable component is ft, and the following condition is satisfied:

$$|fa/\text{ft}|<0.10.$$

5. The projection lens system of claim 1, wherein a focal length of the focus tunable component at a temperature of 50° C. is ft50, the focal length of the projection lens system is f, and the following condition is satisfied:

$$|\text{ft}50/(100 \times f)|<15.0.$$

6. The projection lens system of claim 1, wherein an axial distance between the focus tunable component and one of the lens elements closest to the magnification side in the lens assembly is Dtm, a central thickness of the focus tunable component is CTt, and the following condition is satisfied:

$$0.01<\text{Dtm}/\text{CTt}<1.0.$$

7. The projection lens system of claim 1, wherein the focal length of the projection lens system is f, a projection distance on the magnification side of the projection lens system is OBJ, and the following condition is satisfied:

$$0.01<10 \times f/\text{OBJ}<0.25.$$

8. The projection lens system of claim 1, wherein the focal length of the projection lens system is f, a curvature radius of a magnification-side surface of one of the lens elements closest to the magnification side in the lens assembly is Rm, and the following condition is satisfied:

$$f/Rm<3.0.$$

9. The projection lens system of claim 1, wherein a wavelength of the light incident into the projection lens system is λ, and the following condition is satisfied:

$$750 \text{ nm}<\lambda<1500 \text{ nm}.$$

10. The projection lens system of claim 1, wherein the focus tunable component is a liquid lens set or a liquid crystal lens set.

11. The projection lens system of claim 1, wherein a maximum value of refractive indices of materials of the focus tunable component and the lens elements of the lens assembly is Nmax, and the following condition is satisfied:

$N\text{max} < 1.70.$

12. The projection lens system of claim 1, wherein the lens assembly comprises three lens groups, in order from the magnification side to the reduction side, having positive refractive power, negative refractive power and positive refractive power respectively, and at least three of the lens elements of the lens assembly have Abbe numbers smaller than 30.0.

13. The projection lens system of claim 1, wherein an axial distance between a reduction-side surface of one of the lens elements closest to the reduction side in the lens assembly and the conjugation surface on the reduction side is BL, the focal length of the projection lens system is f, and the following condition is satisfied:

$0.01 < BL/f < 0.30.$

14. The projection lens system of claim 1, wherein an effective radius of a reduction-side surface of one of the lens elements closest to the reduction side in the lens assembly is SDr, an effective radius of a magnification-side surface of one of the lens elements closest to the magnification side in the lens assembly is SDm, and the following condition is satisfied:

$0.10 < SDr/SDm < 1.20.$

15. The projection lens system of claim 1, wherein a maximum value of effective radii of all surfaces of the lens elements in the lens assembly is SDmax, and the following condition is satisfied:

$0.1 \text{ mm} < SD\text{max} < 0.98 \text{ mm}.$

16. The projection lens system of claim 1, wherein a vertical distance between a position of an inflection point on a magnification-side surface of one of the lens elements closest to the reduction side in the lens assembly and an optical axis is Yp1, a vertical distance between a position of an inflection point on a reduction-side surface of the lens element closest to the reduction side in the lens assembly and the optical axis is Yp2, the focal length of the projection lens system is f, and the following condition is satisfied:

$0.01 < Yp1/f < 1.0;$ or $0.01 < Yp2/f < 1.0.$

17. The projection lens system of claim 1, further comprising:
an aperture stop, wherein a diameter of the aperture stop is DS, an axial distance between a magnification-side surface of one of the lens elements closest to the magnification side in the lens assembly and the conjugation surface on the reduction side is TL, and the following condition is satisfied:

$TL/DS < 4.0.$

18. The projection lens system of claim 1, wherein an f-number of the projection lens system is Fno, a half of a maximum field of view of the projection lens system is HFOV, and the following conditions are satisfied:

$1.50 < Fno < 3.0;$ and $|\tan(HFOV)| < 0.30.$

19. The projection lens system of claim 1, wherein an optical distortion of an effective radius position on the conjugation surface on the reduction side of the projection lens system is DIST, and the following condition is satisfied:

$|DIST| < 1\%.$

20. The projection lens system of claim 1, wherein at least half of a total number of the lens elements in the lens assembly are made of plastic materials, and both of a reduction-side surface and a magnification-side surface of each of the lens elements made of the plastic materials are aspheric.

21. The projection lens system of claim 20, wherein a temperature coefficient of refractive index of each of the lens elements made of the plastic materials in the lens assembly is dn/dt, and the following condition is satisfied:

$-150 \times 10^{-6}(1/°C.) < dn/dt < -50 \times 10^{-6}(1/°C.).$

22. The projection lens system of claim 1, wherein at least three of the lens elements of the lens assembly have Abbe numbers smaller than 23.0.

23. The projection lens system of claim 1, wherein a curvature radius of a reduction-side surface of one of the lens elements closest to the reduction side in the lens assembly is Rr, a curvature radius of a magnification-side surface of one of the lens elements closest to the magnification side in the lens assembly is Rm, and the following condition is satisfied:

$-1.0 < (Rr+Rm)/(Rr-Rm) < 1.0.$

24. The projection lens system of claim 1, wherein a total number of the lens elements in the lens assembly is N, and the following condition is satisfied:

$2 \leq N \leq 7.$

25. The projection lens system of claim 1, wherein a sum of central thicknesses of the lens elements in the lens assembly is ΣCTa, and the following condition is satisfied:

$\Sigma CTa < 4.0 \text{ mm}.$

26. A projection apparatus, comprising:
the projection lens system of claim 1; and
at least one light source disposed on the reduction side of the projection lens system.

27. The projection apparatus of claim 26, wherein the light source is a vertical-cavity surface-emitting laser, which is disposed on the conjugation surface on the reduction side of the projection lens system.

28. The projection apparatus of claim 26, wherein a maximum effective diameter of the light source is DL, and the following condition is satisfied:

$0.1 \text{ mm} < DL < 1.50 \text{ mm}.$

29. A sensing module, comprising:
a projection apparatus, comprising:
the projection lens system of claim 1; and
at least one light source; and
an image sensing apparatus, comprising:
an imaging lens system; and
an image sensor disposed on an image surface of the imaging lens system;
wherein the imaging lens system is for receiving an information on the conjugation surface on the magnification side of the projection lens system, and for imaging the information on the image sensor.

30. The sensing module of claim 29, wherein the projection lens system further comprises a diffractive optical element, which is disposed on a magnification side of the lens assembly.

31. The sensing module of claim 29, wherein the light source is a vertical-cavity surface-emitting laser, which is disposed on the conjugation surface on the reduction side of the projection lens system.

32. The sensing module of claim 29, wherein a sum of central thicknesses of the lens elements in the lens assembly is ΣCTa, and the following condition is satisfied:

$1.0 \text{ mm} < \Sigma CTa < 3.0 \text{ mm}.$

33. An electronic device, comprising:
the sensing module of claim 29.

* * * * *